(12) United States Patent
Nunan

(10) Patent No.: US 7,563,746 B2
(45) Date of Patent: Jul. 21, 2009

(54) CATALYST AND METHOD OF MAKING THE SAME

(75) Inventor: John G. Nunan, Tulsa, OK (US)

(73) Assignee: Umicore AG & Co. KG, Hanau (DE)

( * ) Notice: Subject to any disclaimer, the term of this patent is extended or adjusted under 35 U.S.C. 154(b) by 811 days.

(21) Appl. No.: 10/950,954

(22) Filed: Sep. 27, 2004

(65) Prior Publication Data

US 2005/0037921 A1 Feb. 17, 2005

Related U.S. Application Data

(63) Continuation-in-part of application No. 10/358,845, filed on Feb. 5, 2003, now Pat. No. 7,041,622.

(60) Provisional application No. 60/355,562, filed on Feb. 6, 2002.

(51) Int. Cl.
*B01J 23/40* (2006.01)
*B01J 23/42* (2006.01)
*B01J 23/58* (2006.01)
*B01J 23/56* (2006.01)
*B01J 23/44* (2006.01)

(52) U.S. Cl. ...................... 502/327; 423/212
(58) Field of Classification Search ................. 502/304, 502/327, 328, 330, 332, 333, 334, 355; 423/212, 423/213.2, 213.5; 422/171, 177
See application file for complete search history.

(56) References Cited

U.S. PATENT DOCUMENTS

| 4,859,433 | A | | 8/1989 | Pereira et al. ............... 423/212 |
| 5,160,598 | A | * | 11/1992 | Sawada et al. ............... 204/429 |
| 5,908,800 | A | | 6/1999 | Bonneau et al. ............. 501/103 |
| 5,958,827 | A | * | 9/1999 | Suda et al. ................... 502/304 |
| 6,040,265 | A | * | 3/2000 | Nunan ......................... 502/242 |
| 6,110,862 | A | * | 8/2000 | Chen et al. ................... 502/326 |
| 6,326,329 | B1 | | 12/2001 | Nunan ......................... 502/242 |

OTHER PUBLICATIONS

B.M. Mohamed & J.H. Sharp, "Kinetics and Mechanism of Formation of Tricalcium Aluminate, Ca3Al2O6", Received Jul. 30, 2001, Article in Press, Thermochimica Acta 6944 (2002) 1-10.

* cited by examiner

*Primary Examiner*—George Wyszomierski
*Assistant Examiner*—Mark L Shevin
(74) *Attorney, Agent, or Firm*—Robert G. Weilacher; Smith, Gambrell & Russell

(57) ABSTRACT

In one embodiment, a method for making a composition can comprise combining a Type II aluminum hydroxide gel with a Type II oxygen storage gel prior to calcination to form a combined gel, and spray drying the combined gel to form a dried composite. A composition can comprise a composite comprising a Type II aluminum oxide component and about 5 wt % to about 70 wt % Type II oxygen storage component, based upon a total weight of the composite. The oxygen storage component can comprises a cluster of primary oxygen storage particles having a particle size, measured along a major axis, of about 50 Å to about 100 Å.

20 Claims, 25 Drawing Sheets

| Sample Description | BET Surface Area m²/g | Single Point Pore Vol. @ P/Po = 0.98 cm³/g | Pore Diameter Å |
| --- | --- | --- | --- |
| Sample 1 | 160.77 | 0.3635 | 90.43 |
| Sample 2 | 175.51 | 0.4617 | 105.23 |
| Sample 3 | 170.81 | 0.5367 | 125.68 |
| Sample 4 | 127.96 | 0.8902 | 278.28 |
| Sample 5 | 142.05 | 0.5691 | 160.26 |
| Sample 6 | 117.78 | 0.4931 | 167.47 |

TABLE 1

TABLE 2

| Sample Description | BET Surface Area m²/g | Single Point Pore Vol. @ P/Po = 0.99 cm³/g | Pore Diameter Å |
|---|---|---|---|
| Sample 4 | 66.56 | 0.5256 | 315.87 |
| Sample 5 | 58.50 | 0.4387 | 300.00 |
| Sample 6 | 52.25 | 0.3527 | 269.98 |
| Reference 1 | 50.52 | 0.3053 | 241.72 |

CATALYST AND METHOD OF MAKING THE SAME

CROSS REFERENCE TO RELATED APPLICATIONS

This application is a continuation-in-part application of U.S. patent application Ser. No. 10/358,845, filed Feb. 5, 2003 now U.S. Pat. No. 7,041,622, which claims the benefit of the U.S. Provisional Application Ser. No. 60/355,562 filed Feb. 6, 2002, both of which are incorporated herein in their entirety.

BACKGROUND

Exhaust emission control devices may comprise catalytic converters, evaporative emissions devices, scrubbing devices (e.g., hydrocarbon, sulfur, and the like), particulate filters, traps, adsorbers, absorbers, non-thermal plasma reactors, and the like, as well as combinations comprising at least one of the foregoing devices. One function of these devices is to treat an exhaust gas, thereby reducing the concentration of at least one component in the gas. Such devices may be rated in terms of their performance, wherein the performance of an exhaust emission control device represents a measure of the ability of that device to reduce the concentration of a component(s) in a gas under various conditions.

Catalytic converters are one type of an exhaust emission control device, and comprise one or more catalytic materials disposed on a substrate. The composition of the catalytic materials, the composition of the substrate, and the method by which the catalytic material is disposed on the substrate serve as one way in which catalytic converters are differentiated from one another. Methods of disposing a catalytic material onto a substrate include washcoating, imbibing, impregnating, physisorbing, chemisorbing, precipitating, and combinations comprising at least one of the foregoing deposition methods.

Washcoating includes contacting an admixture of various components of a catalyst with a substrate such that a layer is disposed on and/or in the substrate. The term washcoat as used herein describes the layer or layers of the catalytically active admixture disposed on the substrate. In a three-way conversion catalyst, the washcoat may comprise a metal component, an aluminum oxide component, and an oxygen storage component. Stabilizers, binders, hydrogen sulfide control agents, and the like may also be present in a washcoat. Furthermore, the washcoat may comprise one or more layers of material.

The various components in a washcoat may serve more than one function. For example, the aluminum oxide component (aluminum oxide) in a three way conversion catalyst may act as a support for other components, it may act as a binder within the washcoat or between the washcoat and the substrate, and/or provide a thermally stable porous diluent in the washcoat. The aluminum oxide may also provide catalytic activity of its own. Accordingly, the selection of the components and the various physical properties of the components included in a washcoat may affect the overall catalytic performance of the catalyst. Taking the aluminum oxide component of a three-way conversion catalyst as an example, selection of the aluminum oxide component may have an effect on thermal stability, physical stability, and mass transfer between the gas to be treated and the catalytically active components of the washcoat.

Mass transfer relates to the ability of the exhaust gas to be treated to come in contact and interact with the catalytic materials of the catalyst, and is impacted by, among other variables, available surface area of a material, gas temperature, exhaust gas flow rate, and the like. As such, catalysts, and in particular three way conversion catalysts, may comprise porous materials to impart a larger surface area available for contact by the exhaust gas than would be available using a non-porous material of the same underlying size, shape and dimension. Accordingly, a need remains for further optimization of contact and improved mass transfer between a gas to be treated and a desired catalytic material.

SUMMARY

Disclosed herein are composition, methods of making composition, and systems using the composition. In one embodiment, a method for making a composition can comprise combining a Type II aluminum hydroxide gel with a Type II oxygen storage gel prior to any calcination to form a combined gel, and spray drying the combined gel to form a dried composite.

In one embodiment, a composition can comprise a composite comprising a Type II aluminum oxide component and about 5 wt % to about 70 wt % Type II oxygen storage component, based upon a total weight of the composite. The oxygen storage component can comprises a cluster of primary oxygen storage particles having a particle size, measured along a major axis, of about 50 Å to about 100 Å.

In another embodiment, a composition can comprise a composite comprising a Type II aluminum oxide component and a Type II oxygen storage component. The aluminum oxide component can have alumina primary particles with a particle size, as measured along a major axis, of about 50 Å to about 500 Å. The oxygen storage component can comprise a cluster of primary oxygen storage particles having a particle size, measured along a major axis, of about 50 Å to about 100 Å. The cluster can comprise about 5 to about 500 primary oxygen storage particles.

In one embodiment, an exhaust emission control device can comprise: a housing, a substrate comprising a catalyst supported on a composite, and a retention material disposed between the housing and the substrate. The composite can comprise a Type II aluminum oxide component matrix and a Type II oxygen storage component, wherein the aluminum oxide component has alumina primary particles with a diameter, as measured along a major axis, of about 50 Å to about 500 Å. The oxygen storage component can comprise a cluster of primary oxygen storage particles having a particle size, measured along a major axis, of about 50 Å to about 100 Å. The cluster can comprise about 5 to about 500 primary oxygen storage particles, and can be disposed in the aluminum oxide component.

The above described and other features are exemplified by the following figure and detailed description.

BRIEF DESCRIPTION OF THE DRAWING

Table 1 is a summary of surface area and porosity features of composite powders.

Table 2 is a comparison of aged washcoat porosity properties.

DETAILED DESCRIPTION

Figure 1C:
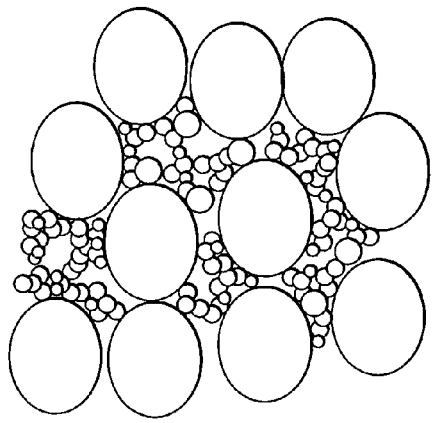
FIG. 1C is a pictorial representation of a composite comprising Type II aluminum oxide and dispersed clusters of Type II OS material.

The terms "first," "second," and the like, herein do not denote any order, quantity, or importance, but rather are used to distinguish one element from another, and the terms "a" and "an" herein do not denote a limitation of quantity, but rather denote the presence of at least one of the referenced items. Additionally, all ranges disclosed herein are inclusive and combinable (e.g., ranges of "up to about 25 wt %, with about 5 wt % to about 20 wt % desired," is inclusive of the endpoints and all intermediate values of the ranges of "about 5 wt % to about 25 wt %," etc.). The modifier "about" used in connection with a quantity is inclusive of the stated value and has the meaning dictated by the context (e.g., includes the degree of error associated with measurement of the particular quantity).

The compositions disclosed herein can include catalyst supports, e.g., for three-way conversion catalyst(s), oxidation catalyst(s), $NO_x$ catalyst(s), and others. Three-way conversion catalysts, for example, include various catalytically active materials and/or components. Such components include one or more catalytically active metals or metal containing components, one or more aluminum oxide components, also referred to herein simply as aluminum oxide or aluminum oxides, and one or more oxygen storage components. Each of these components may have a porosity associated with it. As used herein, porosity is the ratio of the pore volume (i.e., the total volume occupied by the pores in a component) to the total volume occupied by the component. As such, porosity is related to a material's density and is generally defined in terms of internal volume per unit weight or geometric volume occupied by the material. The porosity of a component is also classified according to the size of the individual pores defined within the component. As used herein, pores include openings, passageways, and/or interstices both within and between the constituent particles of the component, as well as between the individual components included in the catalyst.

Classifications based on pore size (i.e., the pore sizes of clusters of primary particles) include Type I, Type II, and Type III components. A Type I component has pores of less than 120 Å in diameter. A Type II component has pores of 120 Å to 1,000 Å in diameter, e.g., greater than or equal to about 40% of the total pore volume of the aluminum oxide component(s), and optionally the oxygen storage component(s), is associated with pores which are 120 Å to about 1,000 Å in diameter. Greater than or equal to about 50%, or, more specifically, greater than or equal to about 80% of the pore volume of the Type II components are associated with pores having diameters of 120 Å to 1,000 Å. Desirably, for the Type II components, greater than or equal to about 40%, or more specifically, greater than or equal to about 50%, and even more specifically, greater than or equal to about 80% of the pore volume is associated with pores of about 180 Å to about 800 Å in diameter. The porosity is determined by nitrogen adsorption/desorption based upon the BJH model. (BHJ is the nitrogen desorption method set forth by E. P. Barret, L. G. Joyner, & P. P. Halenda ("BJH"); Published in: Journal of the American Chemical Society, Volume 73, Page 373, 1951.) Additionally, unless specified otherwise, all diameters are measured along the major axis of the pore.

Described herein is a composition (e.g., a catalyst support) comprising a Type II aluminum oxide component and/or a Type II oxygen storage component as defined above. This composition can be a single Type II porous composite powder of the aluminum oxide component and the oxygen storage component. It has been discovered that performance advantages can be achieved with a composite material concept whereby the less thermally stable component is finely dispersed in a more thermally stable matrix. Further, if the matrix is Type II porous, greater access of the exhaust gaseous components to the active components such as precious metals and oxygen storage components will be possible. Oxygen storage components (such as solid solutions based on Ce, Zr, and the like) have low dispersion when incorporated into washcoat supports using standard mixing and milling procedures. This arises as these materials have particle sizes in the micrometer range, 1 to 20 micrometers (i.e., 10,000 angstroms (Å) to 200,000 Å) and standard mixing and milling of these materials in slurry preparation can only reduce the particle size to 1 micrometer, or at best to 0.1 micrometers. This results in a morphology where the washcoat or support material consists of a mixture of clusters of oxygen storage and aluminum oxide particles or crystallites as illustrated in FIG. 1A. Further, milling of Type II porous materials to small particle sizes is problematic as this type of aggressive milling often destroys the desirable Type II porosity features (e.g., the features of the clusters).

Herein, oxygen storage crystallites or small Type II porous clusters of these crystallites can be dispersed within a Type II porous aluminum oxide matrix as illustrated in FIG. 1C. Not to be limited by theory, it is believed that this morphology for the use of oxygen storage components in three-way catalyst (TWC) applications (as they are significantly less thermally stable compared to aluminum oxide), enables the aluminum oxide component to potentially act as the more thermally stable matrix that inhibits oxygen storage sintering by keeping the OS crystallites from migration and interaction to give larger crystallites or dense clusters.

Figure 1B:
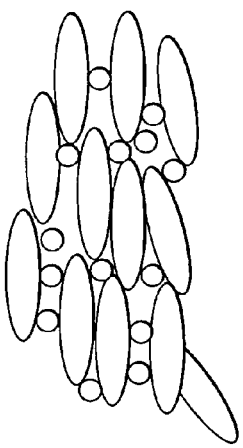
FIG. 1B is a pictorial representation of finely dispersed OS material in Type I aluminum oxide.
Figure 1A:
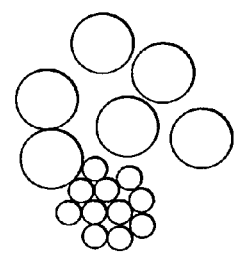
FIG. 1A is a pictorial representation of a physical mixture of Type I OS with Type II aluminum oxide.

It is believed that, although morphologies of highly dispersed materials comprising oxygen storage components and aluminum oxide components exhibited good performance when fresh (or after aging under relatively mild conditions) these type materials tend to fail after severe aging (temperatures greater than 950° C.) because the oxygen storage component becomes buried in the aluminum oxide matrix. These materials comprise morphologies whereby the individual oxygen storage crystallites (50 Å to 100 Å in diameter) were uniformly dispersed over the aluminum oxide surface as illustrated in FIG. 1B. Further, the aluminum oxide used in these composite materials had a Type I porous morphology with average pore diameters in the range of 50 Å to 120 Å.

In addition to the aluminum oxide component and the oxygen storage component, the composition may also comprise catalytic metals such as noble metals, base metals, and combinations comprising at least one of the foregoing metals (e.g., in the form of an oxide). The composition can be a three-way conversion catalyst comprising the Type II composite (Type II aluminum oxide and a Type II oxygen storage component) which is suitable for use in treating a gas in an exhaust emission control device, and which has an improved catalytic performance when compared to a three-way conversion catalyst which does not include a Type II porous aluminum oxide or a Type II oxygen storage component.

Improved catalytic performance includes improved thermal stability, faster light-off activity, improved performance of the catalyst to compensate for air to fuel (A/F) transients during accelerations, and improved oxygen storage component performance. Improved performance can be shown from stand-dynometer testing, dynamic oxygen storage component testing, vehicle testing, and the like.

Improved catalytic performance may be achieved through improved mass transfer between a catalyst and the gas to be treated. To improve mass transfer, the availability of a catalytic material for contact by the gas to be treated can be improved. Accordingly, it has been assumed that a composition with higher surface area results in improved contact between a gas to be treated (e.g., an exhaust gas) and the catalyst, as compared to a composition having less surface area under the same set of conditions. The surface area of a material is directly related to the porosity of that material and the porosity of a material is directly related to the pore size or pore diameter and volume of the pores within that material. Accordingly, it is reasoned that the smaller the pore diameter (within the lower limit being 10 Å) of the material, the more surface area the material has available for catalytic activity, given an overall total pore volume. However, Type II-materials have shown an unexpected benefit by providing an improvement of catalytic performance over similar materials having smaller pore diameters. Interestingly, it has been discovered that the increase in surface area obtained using, for example, Type I components, does not correlate with an improved performance. Thus, disclosed herein is an improvement in catalytic performance obtained using Type II pore component(s), which runs counter to an expected result. Further, Type II porous composite materials have been found to show unexpectedly high performance compared to physical mixtures of Type II porous materials.

Not wishing to be bound by theory, it is believed that the improvement in catalytic performance realized when Type II components are used, as compared to the performance obtained using similar Type I components, results from improved mass transfer between the gas to be treated and the catalytic materials present in and/or on the pores of the Type II component (e.g., in the washcoat). Thus, the benefit in performance obtained using Type II component(s) is believed to result from improved access and contact of the gas with the active catalytic components disposed in or on the Type II aluminum oxide and/or the Type II oxygen storage component, or Type II composite.

The aluminum oxide of the Type II aluminum oxide component may be any aluminum oxide suitable for use in an exhaust emission control device (e.g., gamma, delta, theta, and alpha aluminum oxide), including stabilized aluminum oxides. If a stabilized aluminum oxide is used, preferably less than or equal to about 40 weight percent (wt %) stabilizer may be employed, based on the total weight of the stabilized aluminum oxide. The aluminum oxide component may include a lanthanide (e.g., lanthanum (La), and the like) stabilized gamma aluminum oxide (e.g., referred to herein as La-γ-aluminum oxide), a theta-aluminum oxide (referred to herein as θ-aluminum oxide), a barium (Ba) stabilized gamma aluminum oxide, (referred to herein as Ba-γ-aluminum oxide), or a combination comprising at least one of the foregoing aluminum oxides.

The aluminum oxide component (e.g., crystallites and/or clusters) and oxygen storage component (e.g., clusters) having pores greater than or equal to about 180 Å in diameter, more preferably greater than or equal to about 220 Å in diameter. Also preferred is a Type II aluminum oxide component having pores less than or equal to about 900 Å in diameter, more preferably less than or equal to about 800 Å in diameter, wherein greater than 40% of the pore volume of the aluminum oxide component(s), based on the total pore volume, is associated with pores of 120 Å to about 1,000 Å in diameter. Preferably, greater than or equal to about 50%, more preferably greater than or equal to about 80% of the pore volume of a Type II aluminum oxide component is associated with pores of greater than 120 Å to about 1,000 Å in diameter. Still more preferred, greater than or equal to about 40%, preferably greater than or equal to about 50%, more preferably greater than or equal to about 80% of the total pore volume of a Type II aluminum oxide is associated with pores of about 180 Å to about 800 Å in diameter. It is especially preferred that greater than or equal to about 40%, preferably greater than or equal to about 50%, more preferably greater than or equal to about 80% of the total pore volume of a Type II aluminum oxide component is associated with pores of about 220 Å to about 800 Å in diameter.

The Type II aluminum oxide component may have a density of about 0.1 grams per cubic centimeter (g/cm$^3$) to about 4.0 g/cm3, or, more specifically, about 0.15 g/cm$^3$ to about 2.5 g/cm$^3$, and even more specifically, about 0.2 g/cm$^3$ to about 1.5 g/cm$^3$. The primary particle of the aluminum oxide component can have a size, as measured along a major axis, of about 50 Å to about 500 Å, or, more specifically, about 50 Å to about 200 Å. The surface area of the Type II aluminum oxide component can be greater than or equal to about 40 square meters per gram (m$^2$/g) with greater than or equal to about 50 m$^2$/g preferred, and greater than or equal to about 80 m$^2$/g more preferred.

The oxygen storage component can include cerium oxide (ceria, CeO$_2$) in a form that exhibits oxygen storage properties. For example, ceria in a form that is oxidized to Ce$^{4+}$ under lean exhaust gas conditions wherein an excess amount of oxygen is present in the exhaust stream, and that releases oxygen as it is reduced to the Ce$^{3+}$ oxidation state when rich exhaust gas conditions are present. Ceria may also be used as an oxygen storage component in combination with other materials including, for example, (lanthanum (La), praseodymium (Pr), neodymium (Nd), niobium (Nb), platinum (Pt), palladium (Pd), rhodium (Rh), iridium (Ir), osmium (Os), ruthenium (Ru), tantalum (Ta), zirconium (Zr), yttrium (Y), nickel (Ni), manganese (Mn), iron (Fe) copper (Cu), silver (Ag), gold (Au), gadolinium (Gd), and combinations comprising at least one of the foregoing metals (which may be in the form of an oxide). Some possible oxides (e.g., the metal in combination with oxygen (O)) include, for example, titania (TiO$_2$), praseodymia (Pr$_6$O$_{11}$), yttria (Y$_2$O$_3$), neodynia (Nd$_2$O$_3$), lanthana (La$_2$O$_3$), gadolinium oxide (Gd$_2$O$_3$), or mixtures comprising at least one of the foregoing. The oxygen storage component can comprise ceria, zirconia, and an additive such as alkaline earth metal, rare earth metal, transition metal, and the like, as well as combinations comprising at least one of the foregoing additives. For example, the additive(s) can include strontium, calcium, lanthanum, yttrium, praseodymium, neodymium, manganese, iron, nickel, cobalt, and the like, as well as combinations comprising at least one of the foregoing additives.

Preferred oxygen storage components include those represented by the formula (Ce$_a$Zr$_b$La$_c$Y$_d$Pr$_e$Nd$_f$O$_x$), wherein subscripts a, b, c, d, e, f, and x, represent atomic fractions, subject to the proviso that (a+b+c+d+e+f=1). In addition, the value of "a" can be about 0.05 to about 0.6, or, more specifically, about 0.1 to about 0.5, and even more specifically, about 0.15 to about 0.4, and yet more specifically, about 0.2 to about 0.3. Also: "b" can be less than or equal to about 0.95, or, more specifically, about 0.30 to about 0.8; "c" can be less than or equal to about 0.15, or, more specifically, about 0.01 to about 0.1; "d" can be less than or equal to about 0.15, or, more specifically, about 0.01 to about 0.1; "e" can be less than or equal to about 0.15, or, more specifically, about 0.01 to about 0.1; "f" can be less than or equal to about 0.15, or, more specifically, about 0.01 to about 0.1; and "x" can be less than or equal to about 2.0. The precise value for "x" depends on the type of metal component, its charge, atomic fraction, and the requirement that the metal oxide have a neutral overall charge. Examples of preferred oxygen storage components include, for example, Ce$_{0.376}$Zr$_{0.50}$La$_{0.086}$Pr$_{0.038}$O$_{1.95}$, and Ce$_{0.25}$Zr$_{0.65}$La$_{0.04}$Y$_{0.06}$O$_{1.95}$.

The Type II oxygen storage component(s) can have a pore volume associated with pores of about 130 Å to about 900 Å in diameter, or, more specifically, about 200 Å to about 800 Å in diameter. Greater than or equal to about 40% of the total pore volume of the oxygen storage component, can be associated with pores of 120 Å to about 1,000 Å in diameter, or, more specifically, greater than or equal to about 50%, and, even more specifically, greater than or equal to about 80% of the total pore volume of the oxygen storage component are associated with pores of greater than 120 Å to about 1,000 Å in diameter. In another embodiment, greater than or equal to about 40%, or, more specifically, greater than or equal to about 50%, or, even more specifically, greater than or equal to about 80%, of the pore volume of the oxygen storage component is associated with pores of about 180 Å to about 800 Å in diameter.

The Type II oxygen storage component may have a density of about 0.1 g/cm$^3$ to about 6.0 g/cm$^3$, or, more specifically, about 0.2 g/cm$^3$ to about 3.0 g/cm$^3$, and, even more specifically, about 0.3 g/cm$^3$ to about 1.5 g/cm$^3$. The surface area of the Type II oxygen storage component can be greater than or equal to about 20 square meters per gram (m$^2$/g), or, more specifically, greater than or equal to about 30 m$^2$/g and, even more specifically, greater than or equal to about 40 m$^2$/g.

The Type II oxygen storage component can be present in the composite in an amount of about 5 wt % to about 70 wt %, or, more specifically, about 10 wt % to about 50 wt %, or, even more specifically, about 20 wt % to about 40 wt %, based upon a total weight of the composite. The Type II oxygen storage component can comprise cluster(s) of primary oxygen storage particles having a particle size, measured along a major axis, of about 50 Å to about 100 Å. A cluster can comprise about 5 to about 500 primary oxygen storage particles, or, more specifically, about 10 to about 150 primary oxygen storage particles, or, even more specifically, about 20 to about 50 primary oxygen storage particles.

The composite comprising the Type II aluminum oxide component and the Type II oxygen storage component can have a pore volume of about 0.2 cubic centimeters per gram (cm$^3$/g) to about 1.2 cm$^3$/g, or, more specifically, about 0.6 cm$^3$/g to about 1.0 cm$^3$/g. The composite can also have a surface area of about 40 to about 200 m$^2$/g, or, more specifically, about 80 m$^2$/g to about 150 m$^2$/g.

The method of making the composition can affect the properties of the resultant composition. A composition comprising a physical mixture of aluminum oxide components and oxygen storage components is prepared by forming powders of the aluminum oxide components and the oxygen storage components, mixing the powders (e.g., in water and acid) to form the wash coat, and milling to attain a desired particle size (e.g., about 5.0 micrometer). For example, an aluminum hydroxide precursor is optionally stabilized with lanthanum, precipitated, and hydrothermally treated to form an aluminum hydroxide colloidal dispersion, e.g., a sol, gel, or the like (hereinafter gel). The aluminum hydroxide gel is washed and dried, leaving boehmite ($Al(OH)_3$), which is calcined at about 600° C. to about 900° C. to form aluminum oxide powder ($Al_2O_3$). The oxygen storage components are formed, for example, by starting with salts (e.g., cerium (Ce), zirconium (Zr), lanthanum (La), yttrium (Y), nitrate $(NO_3)_x$ salts). They are precipitated with heating (e.g., to greater than 25° C. to 95° C.) or without heating (e.g., a temperature of about 15° C. to 25° C.) to form an OS hydroxide gel (e.g., $Ce,Zr,La,Y(OH)x$ gel). The OS hydroxide gel can be aged, and then washed, dried, and calcined to form the oxide powder (e.g., $Ce,Zr,La,YO_x$). The oxygen storage powder component and aluminum oxide powder can be mixed in water and acid, and milled to a mean value of about 2 micrometers to about 10 micrometers.

A composition washcoat comprising a single composite (i.e., not a physical mixture as described above) of the aluminum oxide component(s) and oxygen storage component(s), can be formed by combining the gels, aging, drying, and optionally, calcining. For example an aluminum hydroxide precursor can optionally be precipitated (to form an aluminum hydroxide gel), stabilized, and hydrothermally treated (to induce crystallite growth and particle flocculation) to form an open porous structure that will be maintained after calcination. Flocculation can also be induced through the addition of selective additives and/or appropriate pH adjustment during precipitation and aging of the aluminum hydroxide gel. Desirably, the crystallite size, crystallite shape (aspect ratio), and the type of clustering of the primary particles or crystallites, can be controlled. In the case of aluminum oxide components, formation of crystallites of low aspect ratio (e.g., less than or equal to about 5) large size, and clustering of crystallites can be used to induce Type II porosity. An exemplary aluminum oxide component, in its finished, calcined form, is commercially available from SASOL and is sold under the trade name PURALOX HP-14-150.

Similarly an oxygen storage component precursor (e.g., $Ce,Zr,La,Y,(NO_3)_x$ salts) can be precipitated (e.g., by combining with a base) and aged under appropriate conditions of pH and temperature to induce flocculation of the primary OS hydroxide gel and generate an OS hydroxide gel having an open porous structure. The aluminum hydroxide gel is then combined with the OS hydroxide gel to form a combined gel, followed by drying (preferably spray drying), optionally calcining, and optionally milling.

Figure 23:
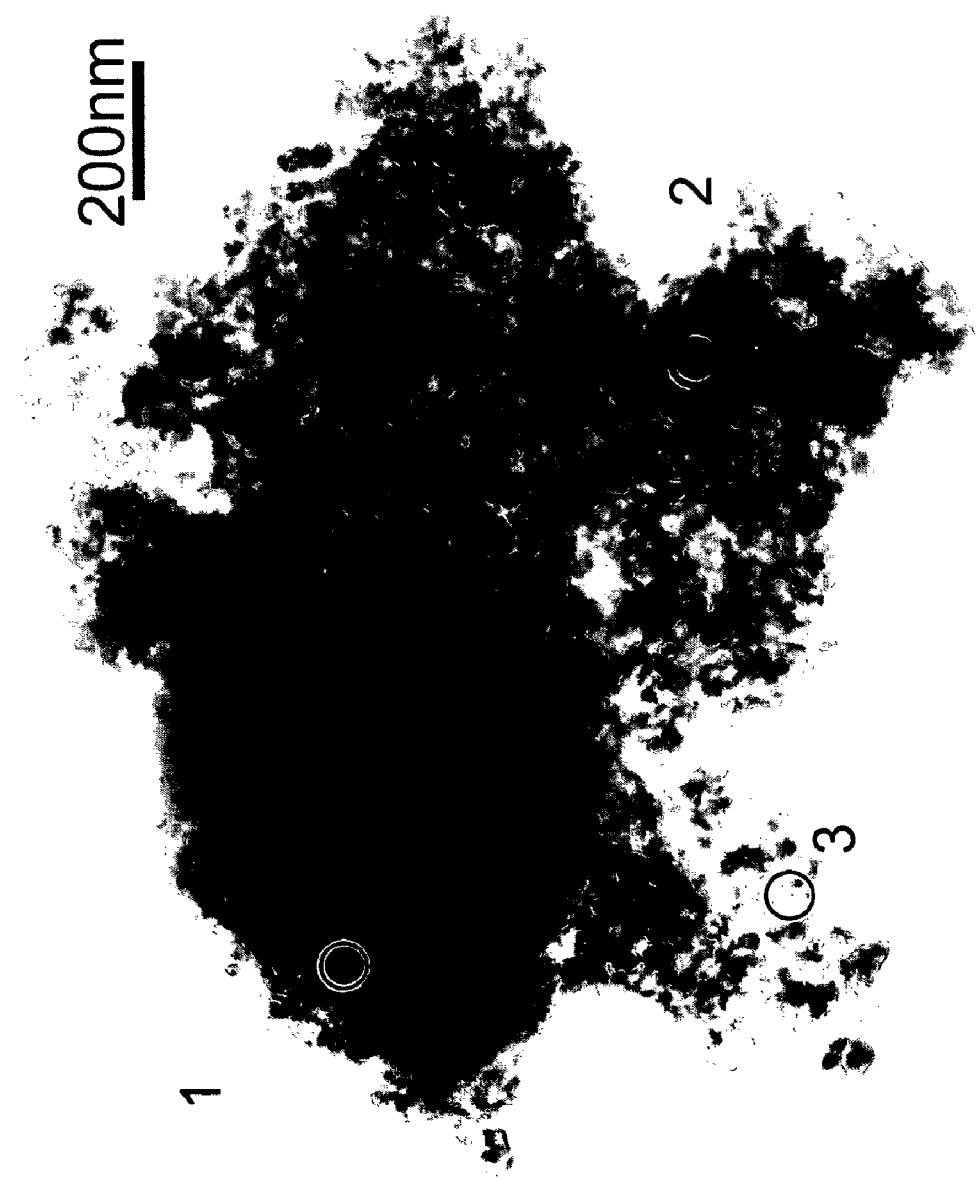
FIG. 23 is a TEM image of Sample 4 after severe engine dynometer aging.
Figure 24:
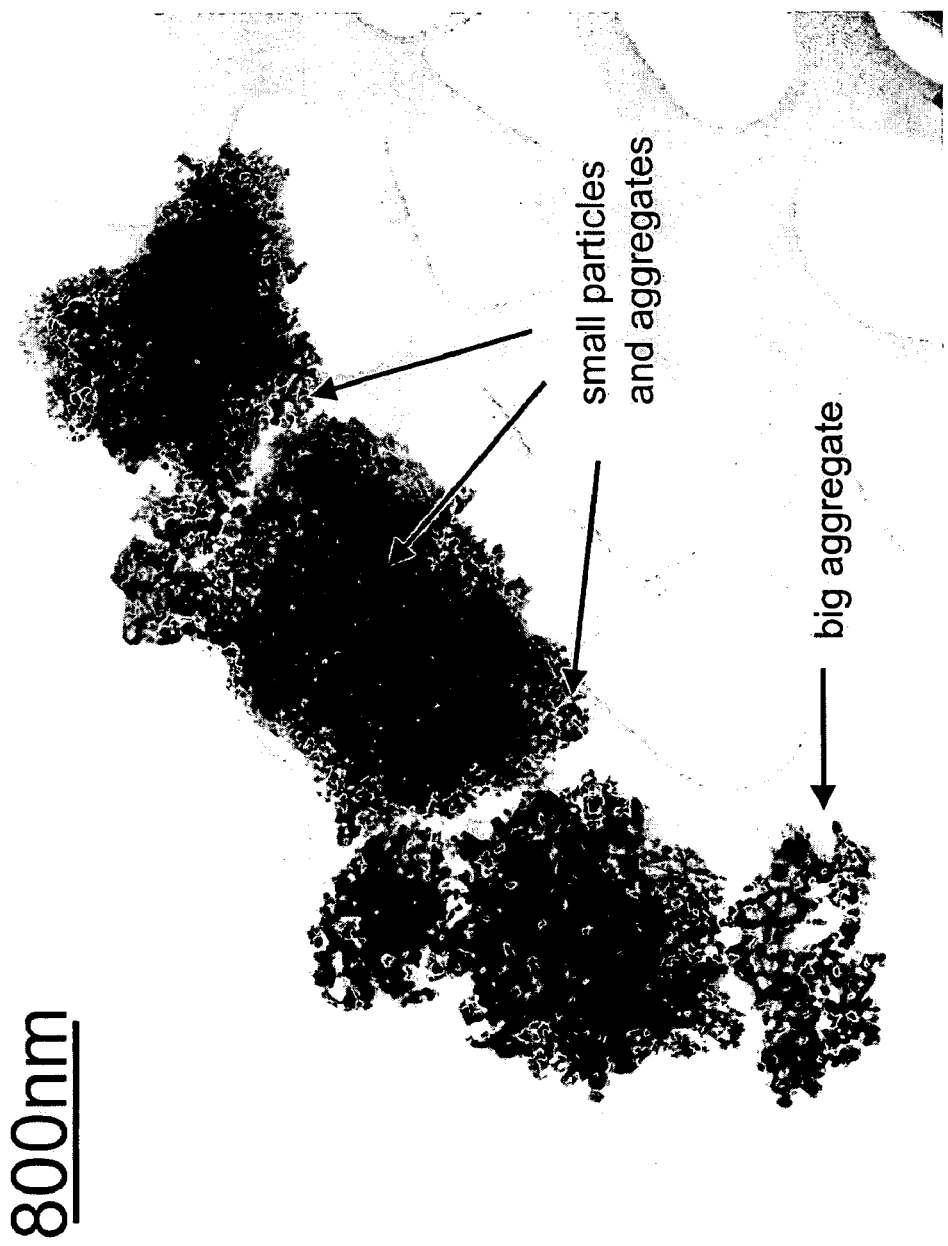
FIG. 24 is a TEM image illustrating the morphology of a physical mixture after severe engine dynometer aging.

Alternatively the precursor salts of the oxygen storage material can be combined and mixed intimately with the aluminum hydroxide gel and then subsequently precipitated and aged under appropriate conditions of pH and temperature to generate the composite hydroxide gel with the OS hydroxide gel dispersed within the aluminum hydroxide gel. The combined gel can be dried (preferably spray dried), optionally calcined, and optionally milled. The resultant composite is different from a physical mixture as can be seen in FIGS. 23 and 24. FIG. 23 shows a composite that has been engine dynometer aged, while FIG. 24 shows a physical mixture that has been engine dynometer aged. It is apparent from a comparison of the two figures that the oxygen storage component is more highly dispersed for the composite compared to the physical mixture. Thus, in the case of the composite the oxygen storage component comprises small, well dispersed clusters of oxygen storage crystallites. Meanwhile, in the case of the physical mixture, very large clusters of oxygen storage component, well separated from the aluminum oxide component, are present, as shown in the lower left corner of FIG. 24.

It is desirable to disperse the oxygen storage components onto the aluminum oxide components. The aluminum oxide components are significantly more thermally stable than the oxygen storage components. However, generating a fine dispersion is a problem with physical mixtures because milling can only reduce the particle size to 1 micrometer. However, small clusters of the OS primary particles can be generated using the preparation techniques described above. The primary particles (also know as crystallites) can have a diameter, measured along a major axis, of about 50 Å to about 100 Å. Dispersion of small clusters of these OS primary particles, and to some extent the individual crystallites, within the Type II aluminum oxide component (e.g., within the matrix) produces improved compositions. Due to the thermal stability of the Type II aluminum oxide components severe thermal treatments of the composition doesn't substantially reduce the oxygen storage component availability for its oxygen storage function (e.g., the oxygen storage component isn't encapsulated within the aluminum oxide component).

The washcoat (e.g., all the components (such as the aluminum oxide, OS, additives, $H_2S$ control agents (such as NiO) and other stabilizers), with the exception of the precious metals) may also include other promoters, stabilizers and the like, and is preferably disposed on a substrate suitable for use in an exhaust emissions control device. The thickness of the washcoat is preferably not sufficient to create an amount of backpressure detrimental to performance, while still being of a thickness sufficient to provide for a durable composition. For example, washcoat thickness of about 20 to about 170 micrometers per washcoat layer can be used in some applications.

Suitable substrates may comprise any material designed for use in the intended environment, (e.g., in a spark ignition or diesel engine environment, in an exhaust flue, and the like) and having the following characteristics: (1) capable of operating at temperatures up to about 600° C., and up to about 1,100° C. for some applications, depending upon the device's location within the exhaust system (manifold mounted, close coupled, or under floor) and the type of system (e.g., gasoline or diesel); (2) capable of withstanding exposure to hydrocarbons, nitrogen oxides, carbon monoxide, particulate matter (e.g., soot and the like), carbon dioxide, and/or sulfur; and (3) having sufficient surface area and structural integrity to support a catalyst, if desired. Some possible materials include cordierite, silicon carbide, metal, metal oxides (e.g., aluminum oxide, and the like), glasses, and the like, and mixtures comprising at least one of the foregoing materials. Some ceramic materials include "Honey Ceram", commercially available from NGK-Locke, Inc, Southfield, Mich., and "Celcor", commercially available from Corning, Inc., Corning, N.Y. These materials may be in the form of foils, perform, mat, fibrous material, monoliths (e.g., a honeycomb structure, and the like), other porous structures (e.g., porous glasses, sponges), foams, pellets, particles, molecular sieves, and the like (depending upon the particular device), and combinations comprising at least one of the foregoing materials and forms, e.g., metallic foils, open pore aluminum oxide sponges, and porous ultra-low expansion glasses.

Although the substrate can have any size or geometry, the size and geometry are preferably chosen to optimize surface area in the given exhaust emission control device design parameters. Typically, the substrate has a honeycomb geometry, with the combs through-channel having any multi-sided or rounded shape, with substantially square, triangular, pentagonal, hexagonal, heptagonal, or octagonal or similar geometries preferred due to ease of manufacturing and increased surface area.

Deposition through washcoating is the preferred method of disposing the catalytic materials onto the substrate. However, other suitable methods including imbibing, impregnating, physisorbing, chemisorbing, precipitating, and combinations comprising at least one of the foregoing disposition methods may also be used.

Located between the substrate and a housing (e.g., a shell) can be a retention material that insulates the shell from both the high exhaust gas temperatures and the exothermic catalytic reaction occurring within the substrate. The retention material, which enhances the structural integrity of the substrate by applying compressive radial forces about it, reducing its axial movement and retaining it in place, is typically concentrically disposed around the substrate to form a retention material/substrate subassembly.

The retention material, which can be in the form of a mat, particulates, or the like, can either be an intumescent material (e.g., a material that comprises vermiculite component, i.e., a component that expands upon the application of heat), a non-intumescent material, or a combination thereof. These materials can comprise ceramic materials (e.g., ceramic fibers) and other materials such as organic and inorganic binders and the like, or combinations comprising at least one of the foregoing materials.

Possible types of exhaust emission control devices include catalytic converters, oxidation catalysts evaporative emissions devices, scrubbing devices (e.g., hydrocarbon, sulfur, and the like), particulate filters/traps, adsorbers (e.g., $NO_x$ adsorbers), absorbers, plasma reactors (e.g., non-thermal plasma reactors), and the like, as well as combinations comprising at least one of the foregoing devices. An exemplary emission control device comprises a housing disposed around a substrate comprising the composition, with a retention material disposed therebetween. Each end of the device can, independently, have an endcone, endplate, or the like.

EXAMPLES

The following examples are for illustrative purposes only and are not intended to limit the scope hereof.

TABLE I

| Sample No. | OS | $Al_2O_3$ | Type of catalyst support |
|---|---|---|---|
| Sample 1 | Type I | Type I | Composite |
| Sample 2 | Type II | Type I | Composite |
| Sample 3 | Type II | Type I | Composite |
| Sample 4 | Type II | Type II | Composite |
| Sample 5 | Type I | Type II | Composite |
| Sample 6 | Type I | Type I | Composite |
| Reference 1 (2-layer) | Type I | Type II | Physical Mixture |
| Reference 2 (1-layer) | Type II | Type II | Physical mixture |
| Reference 3 | Type I | Type II | Physical mixture |
| Reference 4 | Type I | Type II | Physical mixture |
| Sample 4-A | Type II | Type II | Composite |
| Sample 4-B | Type II | Type II | Composite |
| Sample 4-C | Type II | Type II | Composite |
| Sample 7 | Type II | Type II | Physical Mixture |

FIGS. 1A-1C illustrate different morphologies. FIG. 1A is a pictorial representation of a physical mixture of Type I oxygen storage crystallite clusters in contact with a Type II aluminum oxide. The aluminum oxide crystallites have low aspect ratio and are loosely clustered to form a Type II morphology. FIG. 1B is a pictorial representation of oxygen storage crystallites highly dispersed within a Type I aluminum oxide matrix. In the current representation the Type I aluminum oxide is shown as having a high aspect ratio (needle/plate like crystallite morphology). FIG. 1C is a pictorial representation of the morphology, obtained by combining the hydro-gels, showing porous/loosely connected clusters of oxygen storage crystallites dispersed in the Type II aluminum oxide matrix.

Figure 2:
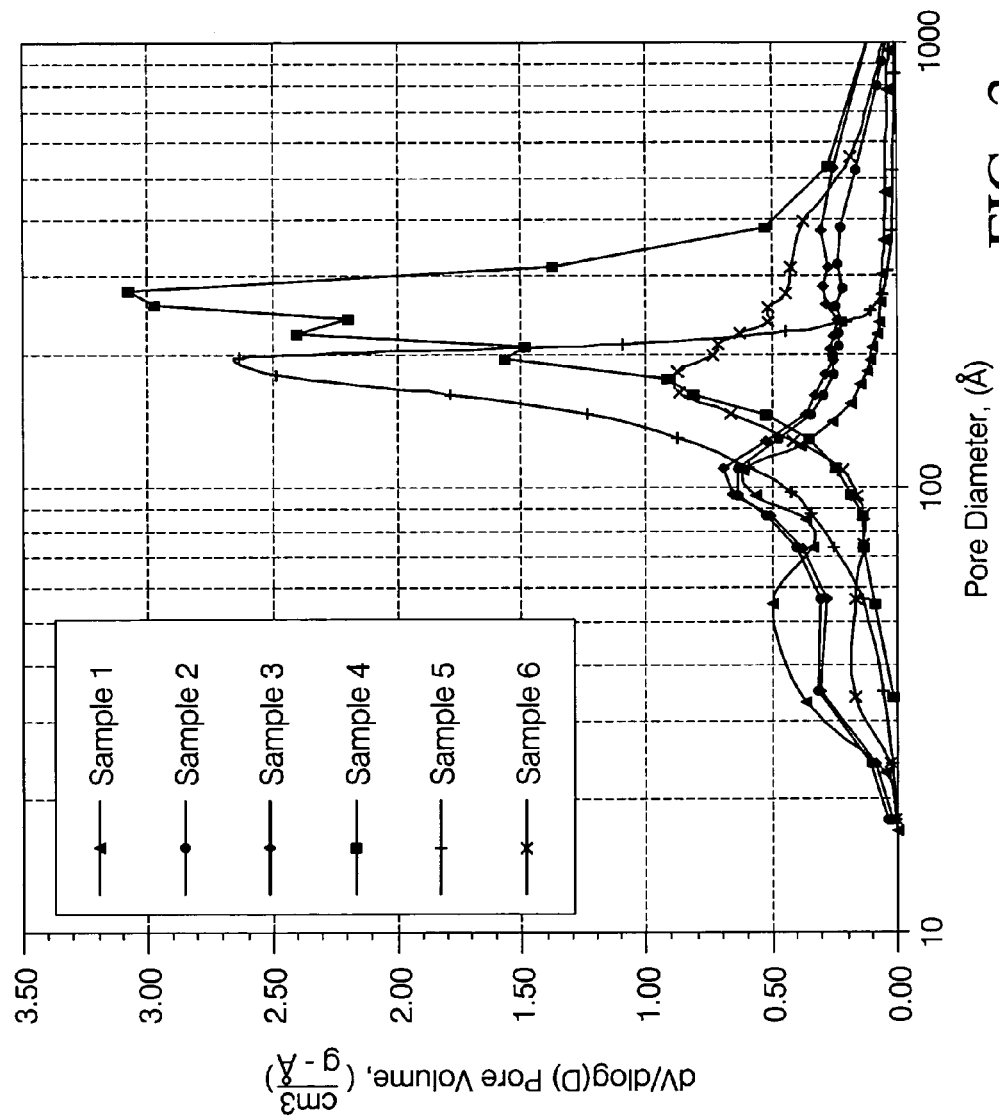
FIG. 2 is a graphical representation of desorption curves for range of composite powders.

FIG. 2 are sets for BJH desorption curves for fresh powders, comparing porosity features of several composite materials of varying pore volume and pore diameter. Sample 1, Sample 2, Sample 3, and Sample 4 are composite materials of the same nominal composition, but built using aluminum oxide component and oxygen storage component of varying morphology. The weight ratio of aluminum oxide/oxygen storage material was 2/1 and the oxygen storage composition was 58.5 wt % $ZrO_2+HfO_2$; $CeO_2$=31.5 wt %, $La_2O_3$=5.0 wt % and $Y_2O_3$=5.0 wt %.

Sample 1 used Type I oxygen storage components and aluminum oxide components; Sample 2 and Sample 3 used Type I aluminum oxide components but Type II oxygen storage components, while Sample 4 used a combination of Type II oxygen storage component and aluminum oxide components in its preparation. It is apparent that the porosity features of the Sample 4 composite are significantly shifted to the Type II regime relative to the other three materials. This is further illustrated in Table 1 where the surface area (Brunauer-Emmett-Teller (BET) surface area in square meters per gram ($m^2$/g)), pore volume (cubic centimeters per gram ($cm^3$/g)), and average pore diameters are summarized. It is note worthy that the pore volume/pore diameters tend to show opposite trends when compared to surface area. Thus, the lowest surface area material of Samples 1-4, namely Sample 4, has the highest pore volume and pore diameter. The other two materials in FIG. 2 and Table 1 (Sample 5 and Sample 6) are also composite materials (from a different material supplier) and have similar composition to the Samples 1-4, but both have significantly lower pore volume and pore diameter compared to Sample 4.

Figure 3:
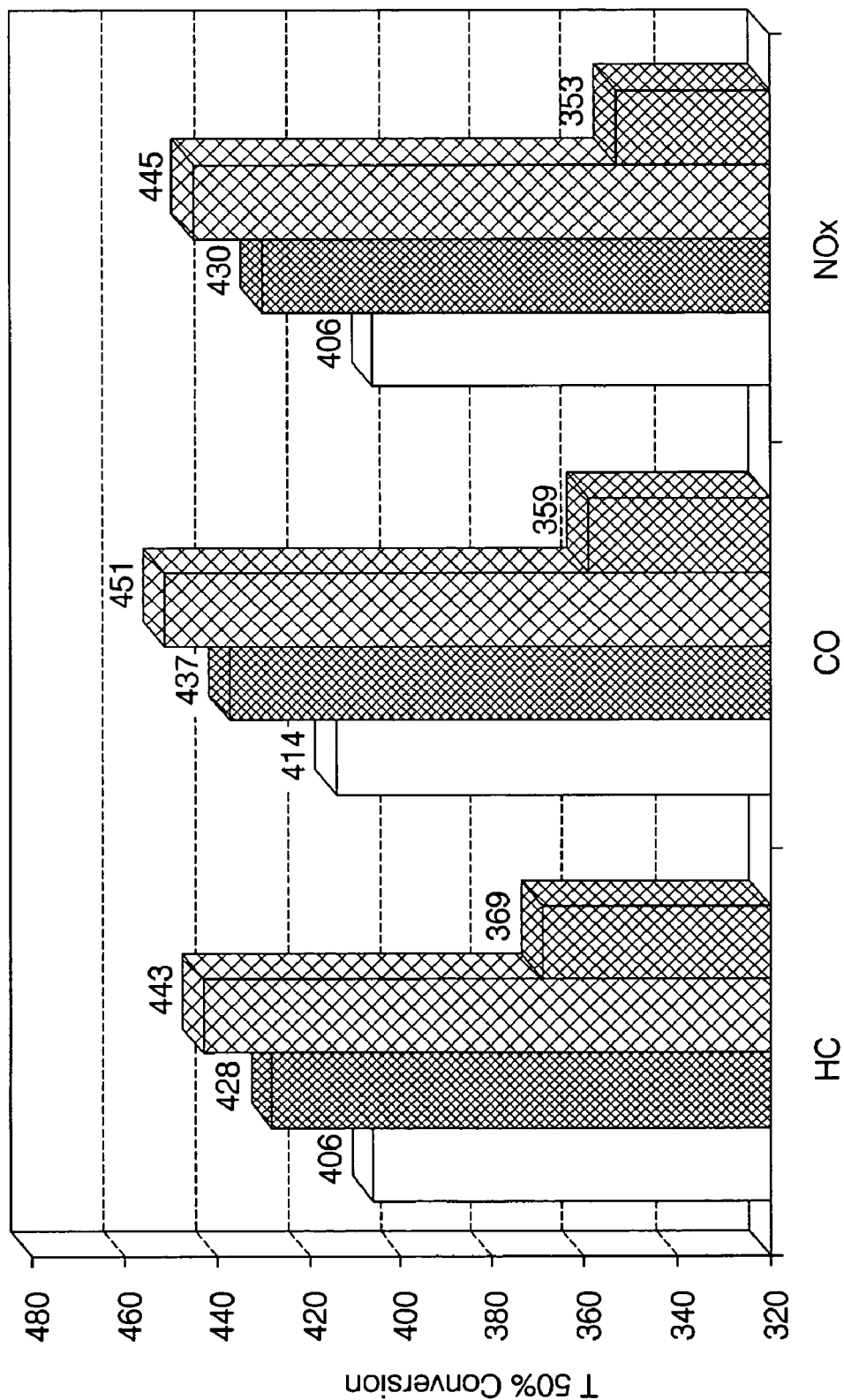
FIG. 3 is a graphical representation of light off temperature for fresh catalysts.

In FIG. 3 is shown the light off performance of three composite materials (Samples 4, 5, and 6) as compared to the Reference 1 (2-layer reference catalyst). The aging was 50 hours of fuel-cut aging with a maximum bed temperature of 1,000° C. This fuel cut aging cycle had two modes. The first was a 300 second cruise in which the engine operated rich with secondary air injection to give a stoichiometric exhaust gas composition at the catalyst inlet. The second mode was 320 seconds long. This mode also operated with the engine running rich with secondary air injection, but every 30 seconds a fuel cut occurred. During the cruise mode the exhaust gas composition was at stoichiometry at the catalyst inlet, the inlet temperature was 675° C., with a bed temperature of 1,000° C.

The light-off test comprised measuring the conversion efficiencies as a function of inlet temperature on a monolithic catalyst. The temperature and time at which the CO, HC, or $NO_x$ conversion efficiency reached 50% was generally defined as the light-off temperature and light-off time respectively.

The light-off activity measurements were done as follows. Light-off testing was done on a Ford 5.0 L MPFI engine. The engine speed was 1,800 RPM (revolutions per minute) with catalyst inlet CO, $O_2$, NOx, and HC concentrations of 0.62 wt %, 0.6 wt %, 1,800 parts per million by volume (ppm), and 1,900 ppm, respectively. The mean A/F ratio during the test was 14.56 with an A/F oscillation amplitude of ±0.65 A/F units at a frequency of 1.0 Hz. The temperature ramp was generated by diverting the exhaust through a heat exchanger. The temperature traverse ramp comprised a ramp from 200° C. to 450° C. at a rate of 51° C. per minute with a GHSV (gas hourly space velocity) of 35,000 $hr^{-1}$. The Pd and Rh loading on the catalyst was 25 grams per cubic foot ($g/ft^3$) at a weight ratio of 0:5:1. (Here the normal convention for defining the noble metal content of three-way-conversion catalysts was used where the loading was expressed in grams per unit geometric volume and the weight ratio is given in the order of Pt:Pd:Rh.) The catalyst geometry and cell density were the same for all of the catalysts evaluated and comprised a 75 $in^3$ (1.2 L) round monolith, 4.0 inches in diameter by 6.0 inches long, and had a cell density of 400 cells per square inch with a cell wall thickness of 6.5 mil.

Of the three composite samples tested, it is apparent that the Sample 4 catalyst had, by far, the lowest light-off temperature, about 350° C. to about 380° C., while the reference had light-off temperatures exceeding 405° C. in all cases, and Samples 5 and 6 exceeded 410° C. in all cases.

Two types of A/F traverse (steady state activity) test were carried out. The first test was done at a catalyst inlet temperature of 400° C. and a GHSV of 35,000 $hr^{-1}$. Again a 5.0 L Ford MPFI engine was used for the test at an engine speed of 1,800 RPM. The traverse test comprised a continuous A/F sweep from an A/F of 15.2 to 13.8 at 0.131 A/F units per minute. During the test the A/F modulation was ±0.65 A/F units at a frequency 1 Hz. The second A/F traverse test was run in a similar manner but under different conditions of temperature, GHSV, and A/F modulation. The catalyst inlet temperature was 482° C., the A/F modulation was ±0.8 A/F units at a frequency of 1 Hz, and the GHSV was 49,000 $hr^{-1}$.

Figure 4:
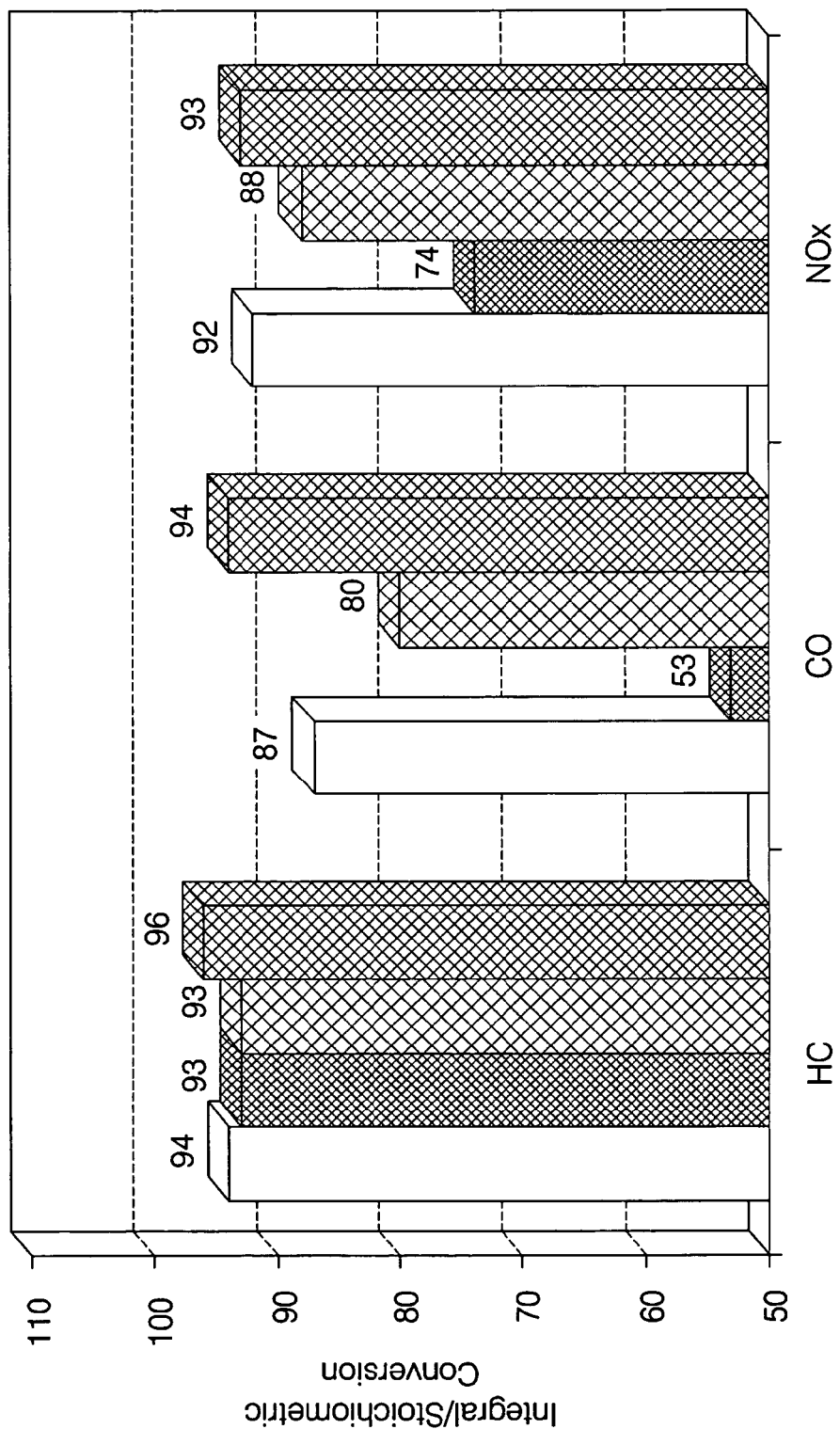
FIG. 4 is a graphical representation of conversion of HC, CO, and NOx.

FIG. 4 illustrates the steady state activity at 482° C. after 50 hours (hrs) fuel cut aging. Again, the best performance was observed for the Sample 4 composite catalyst. Table 2 summarizes the porosity and surface area features of these aged samples when removed from each catalyst after engine dynometer aging and testing. The best performing catalyst (Sample 4) had the highest pore volume and largest pore diameter.

Figure 5:
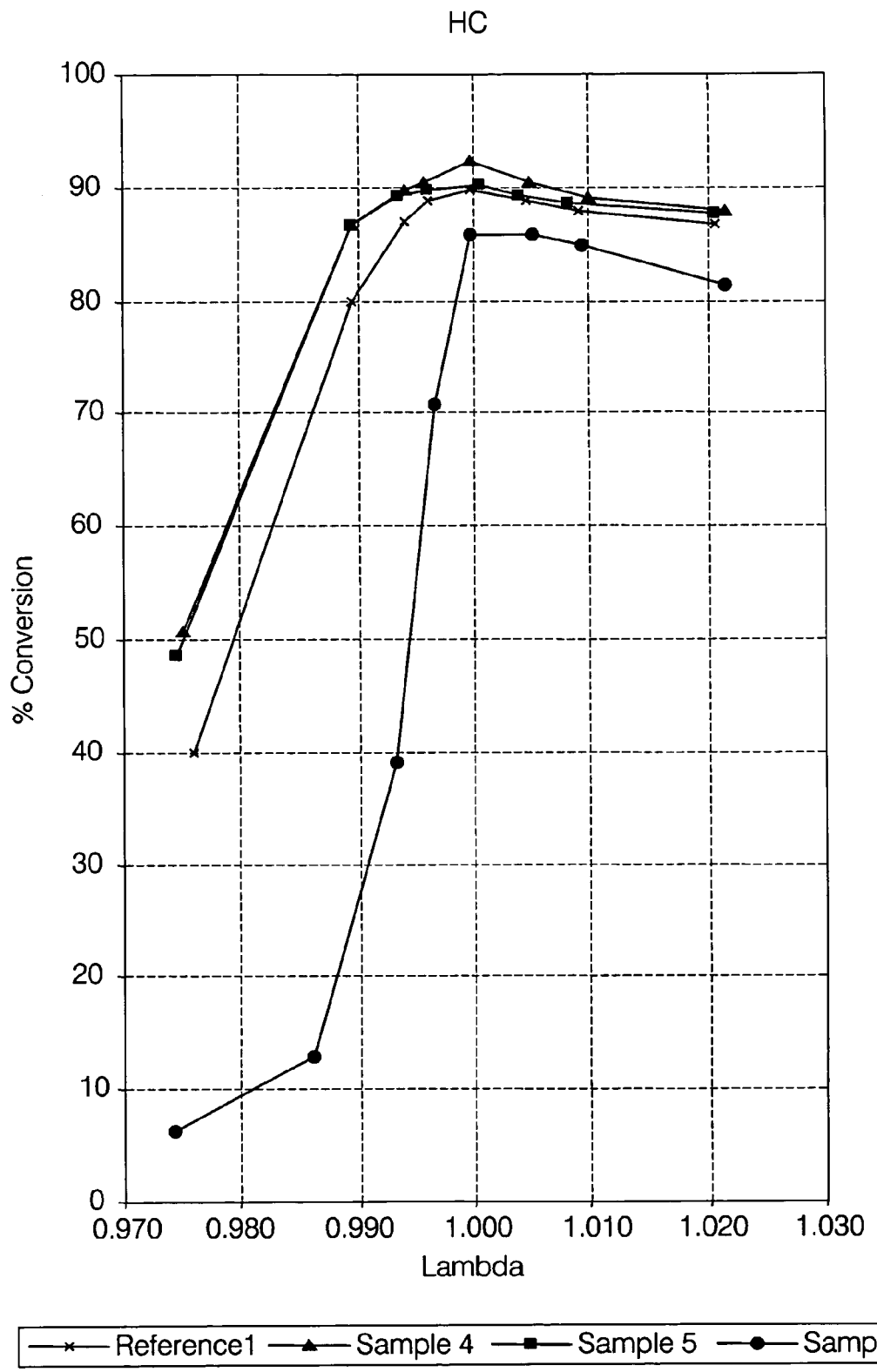
FIG. 5 is a graphical representation of HC conversion after fuel-cut aging for 50 hrs with maximum bed temperature of 1,000° C.
Figure 6:
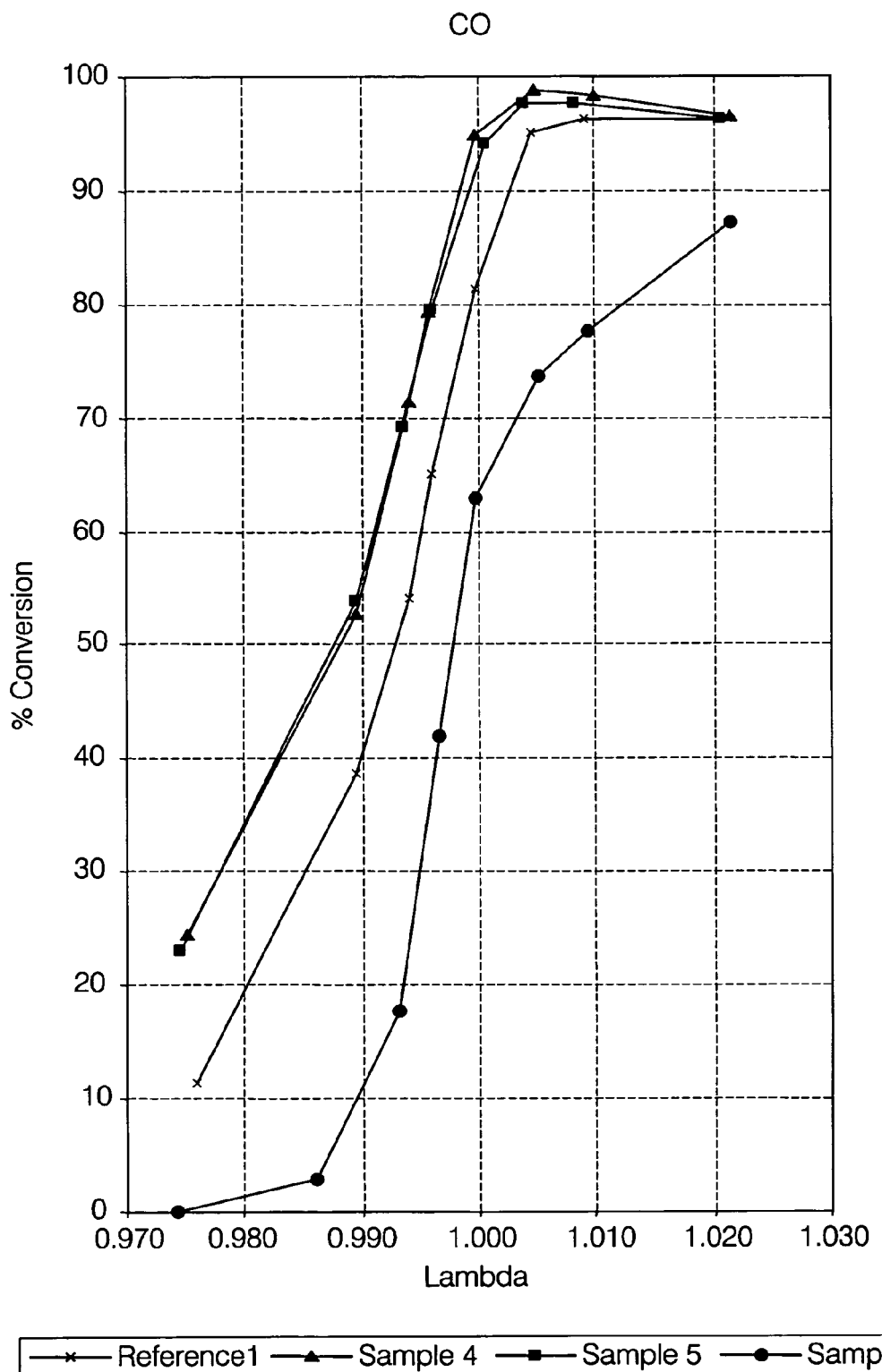
FIG. 6 is a graphical representation of CO conversion after fuel-cut aging for 50 hrs with maximum bed temperature of 1,000° C.
Figure 7:
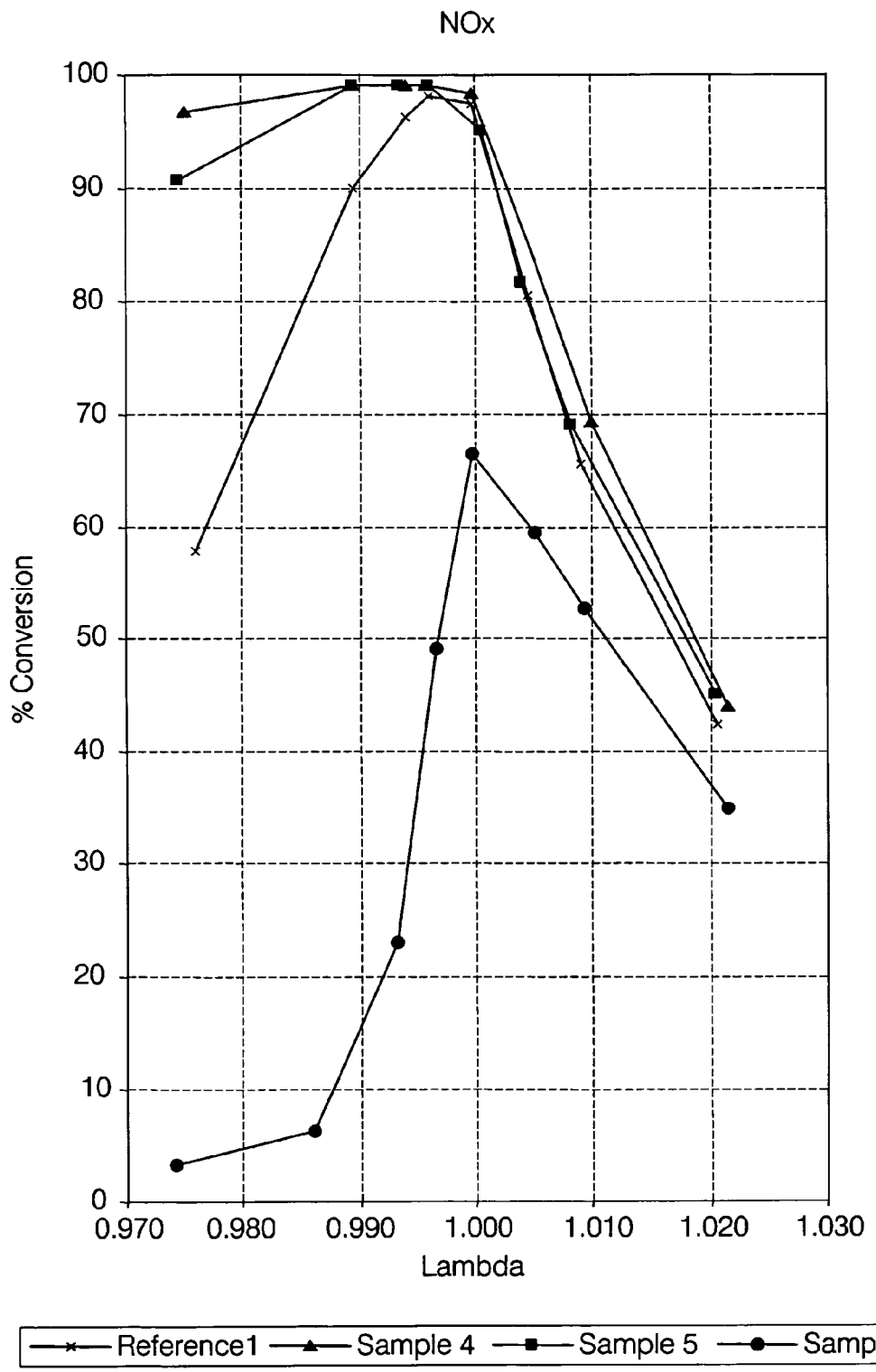
FIG. 7 is a graphical representation of NOx conversion after fuel-cut aging for 50 hrs with maximum bed temperature of 1,000° C.
Figure 8:
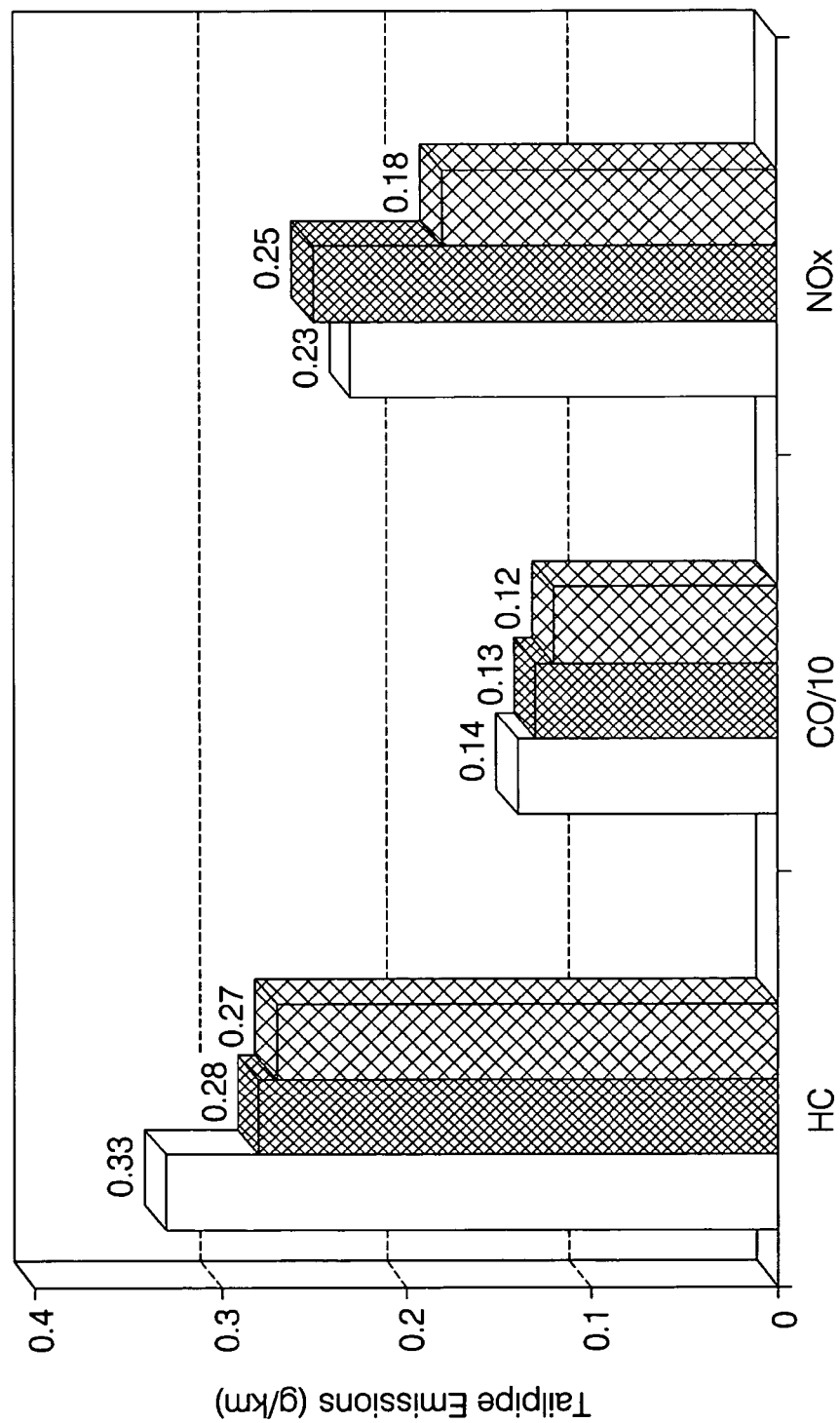
FIG. 8 is a graphical representation of tailpipe emissions for HC, CO, and NOx, after fuel-cut aging for 50 hrs with a maximum bed temperature of 1,000° C.; Pd+Rh of 25 g/ft$^3$ at Pd/Rh ratio of 0:5:1; catalyst volume of 1.2 L; 400 cpsi/6.5 mil; ECE/EUDC Test.

FIGS. 5-7 again shown a comparison between the same four catalysts, but carried out on a different aging engine. The data in FIG. 8 are tail-pipe emissions for vehicle testing using the European driving cycle (ECE/EUDC), lower emissions representing superior performance. Again the best performance is observed for the Sample 4.

Figure 9:
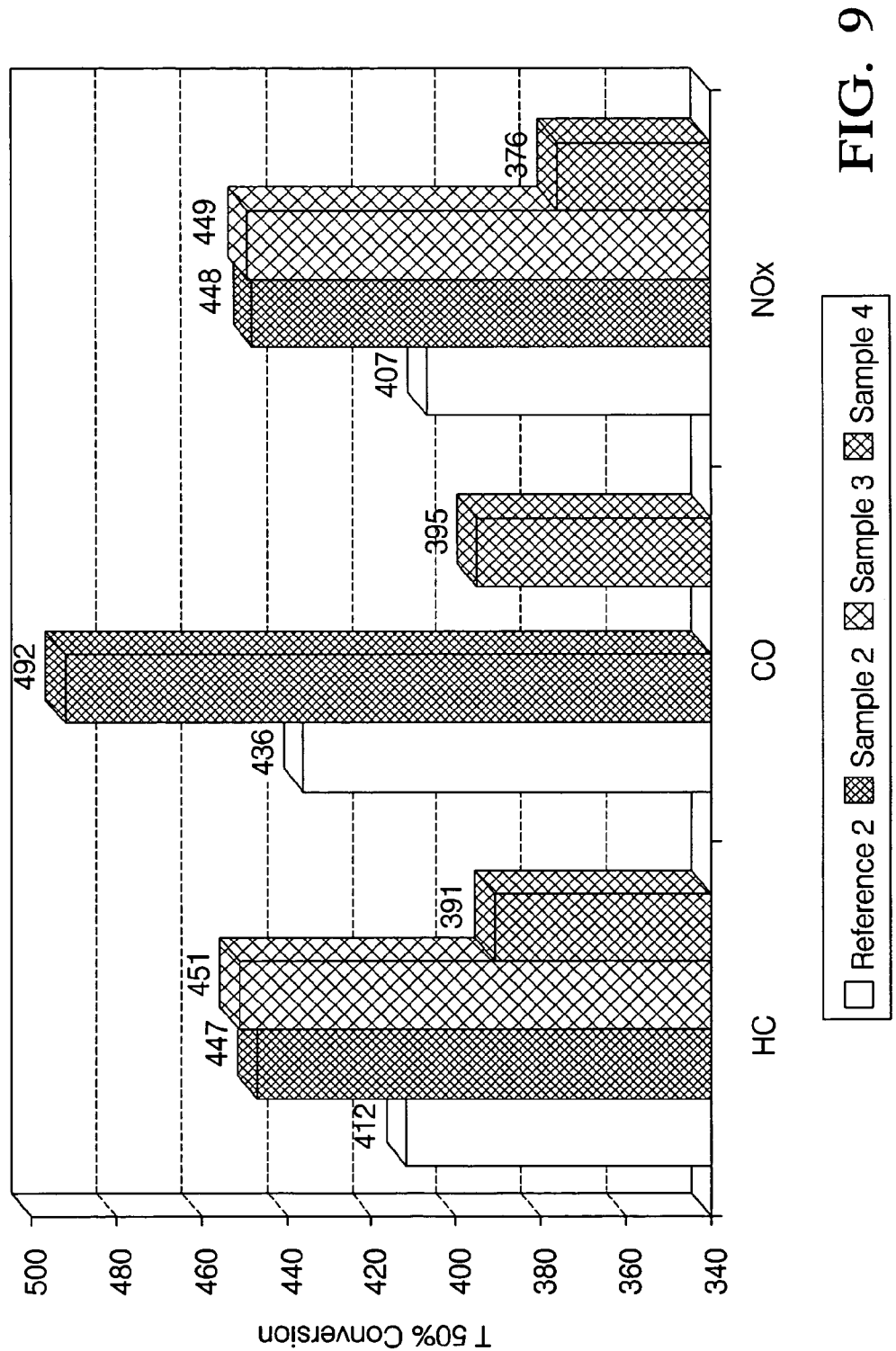
FIG. 9 is a graphical representation of light-off temperature after aging of 50 Hrs; with a maximum bed temperature of 1,050° C.; Pd+Rh of 25 g/ft$^3$ at Pd/Rh ratio of 0:5:1.
Figure 10:
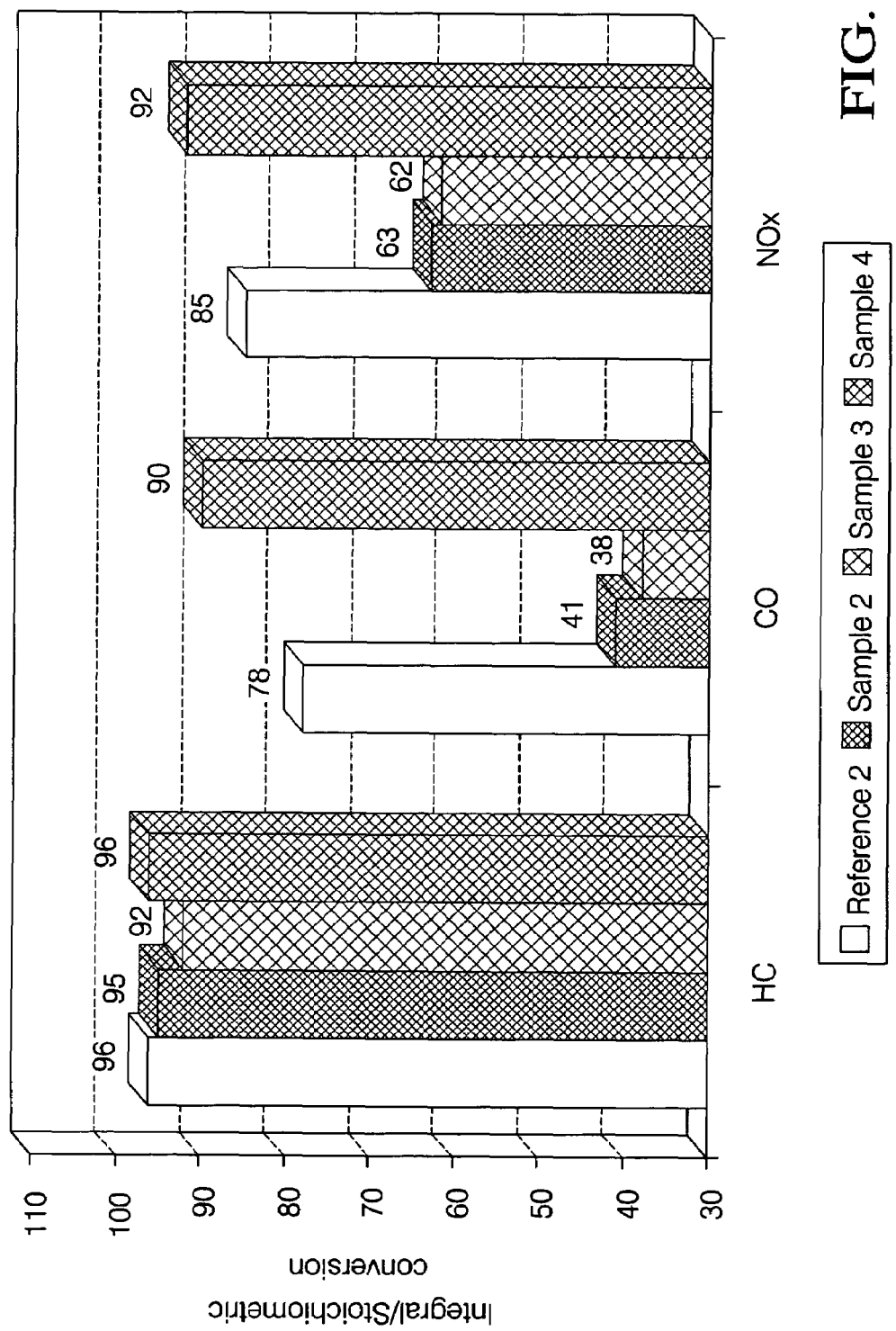
FIG. 10 is a graphical representation of the percent conversion for HC, CO, and NOx for a A/F traverse test @482° C.; aging of 50 hrs; with a maximum bed temperature of 1,050° C.; Pd+Rh of 25 g/ft$^3$ at Pd/Rh ratio of 0:5:1.

FIGS. 9 and 10 summarize the performance results for a comparison between Sample 2, Sample 3, Sample 4, and Reference 2 (a 1-layer/1-pass reference catalyst) after a severe type aging (rich, lean, and stoichiometric transients) with a maximum bed temperature of 1,050° C.). This aging was done on a Chevrolet 7.4 L V-8 engine with a closed loop wide range sensor control and multi-point fuel injection. The aging cycle included a 20 second stoichiometric mode with a catalyst bed temperature of 950° C., a 6.0 second rich mode (A/F of 13.15); a 10 second lean (A/F of 14.8) exotherm mode with a bed temperature of 1,050° C., and finally a 4 second lean (A/F of 16.15) mode with secondary air added. The washcoat loading and platinum group metal loading were identical for all four catalysts. For the reference catalyst both the aluminum oxide component and oxygen storage components were Type II components and were added as two different powders. Otherwise the catalysts were the same. It is apparent that the Sample 4 catalyst performed the best, having the lowest light-off temperature (FIG. 9) and highest steady state activity (FIG. 10).

Figure 11:
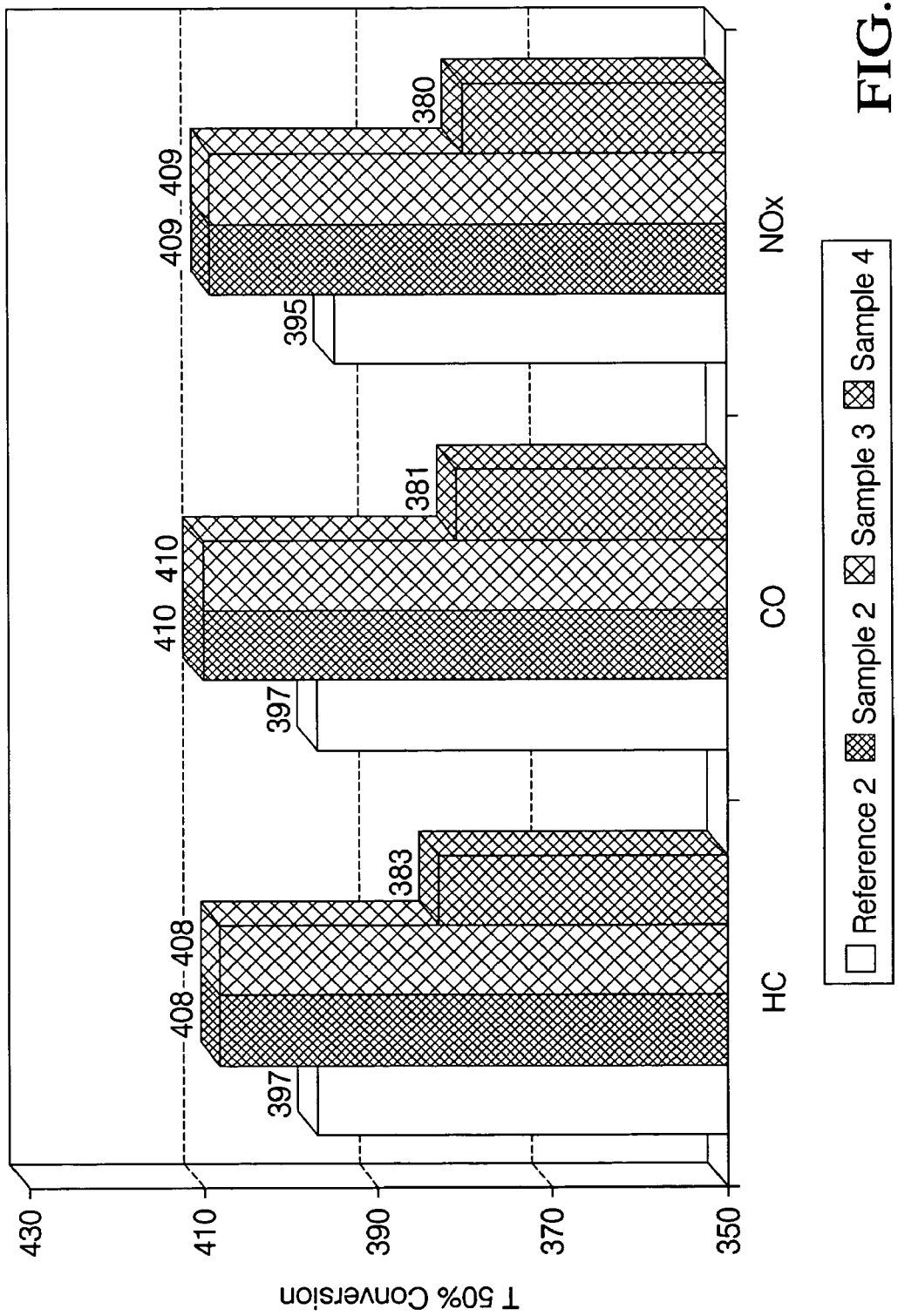
FIG. 11 is a graphical representation of light-off temperature after fuel cut aging for 50 hours with a maximum bed temperature of 1,000° C.; Pd+Rh of 25 g/ft$^3$ at Pd/Rh ratio of 0:5:1.
Figure 12:
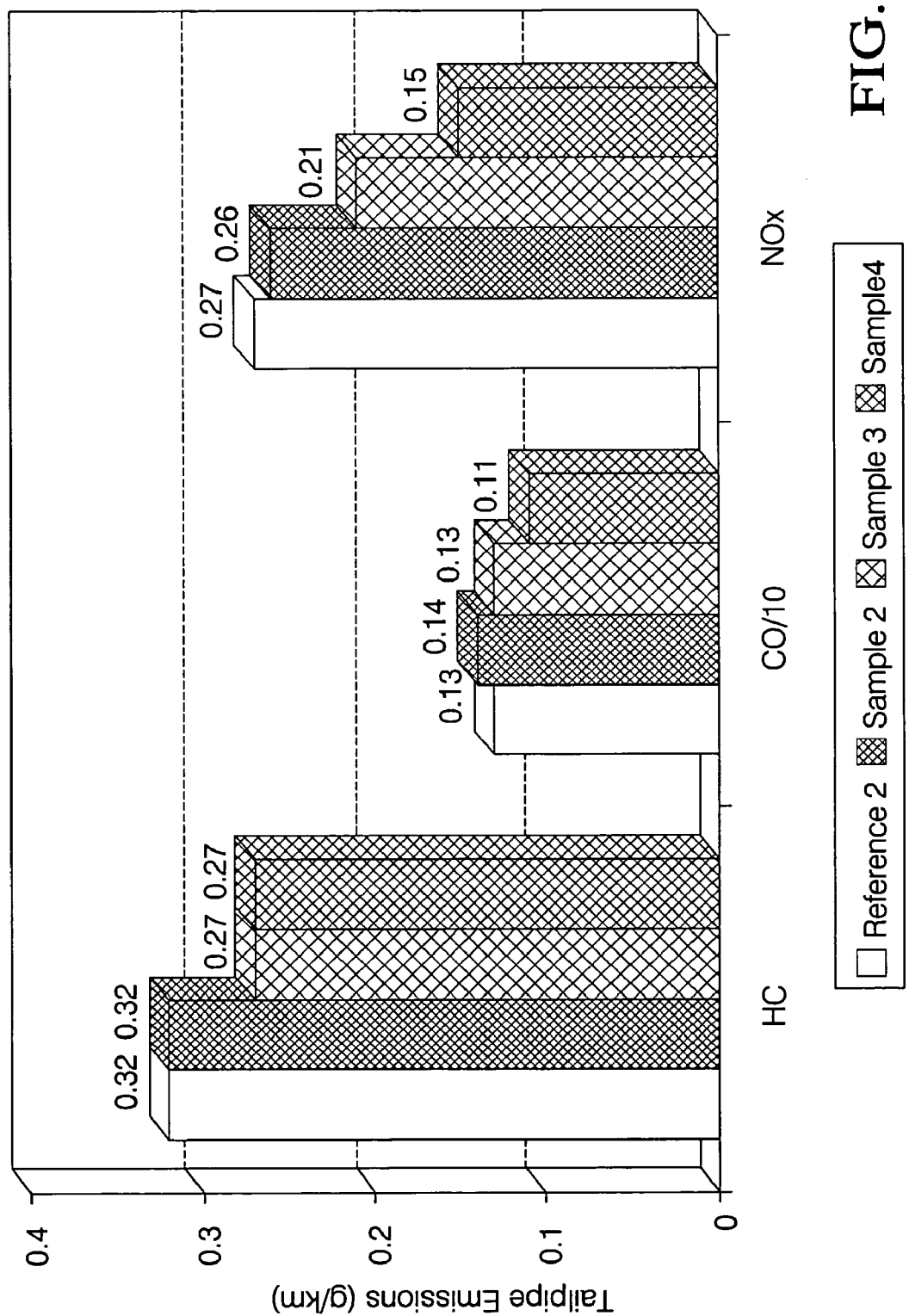
FIG. 12 is a graphical representation of tailpipe emissions of HC, CO, and NOx, after fuel-cut aging for 50 hrs with a maximum bed temperature of 1,000° C.; Pd+Rh of 25 g/ft$^3$ at Pd/Rh ratio of 0:5:1; catalyst volume of 1.2 L; 400 cpsi/6.5 mil; ECE/EUDC Test.
Figure 13:
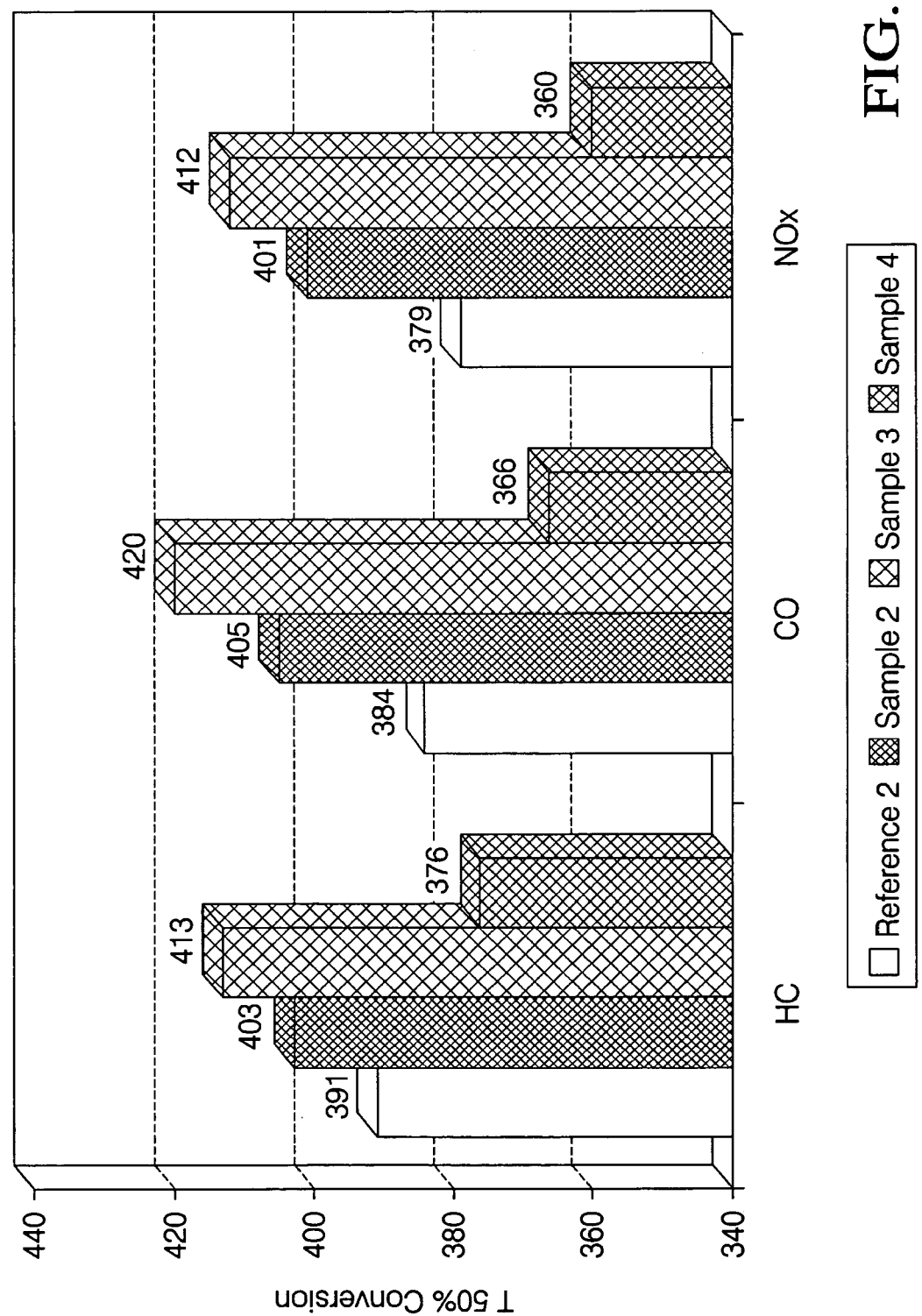
FIG. 13 is a graphical representation of light-off temperature after fuel-cut aging for 100 hrs with a maximum bed temperature of 1,000° C.; Pd+Rh of 25 g/ft$^3$ at Pd/Rh ratio of 0:5:1.
Figure 14:
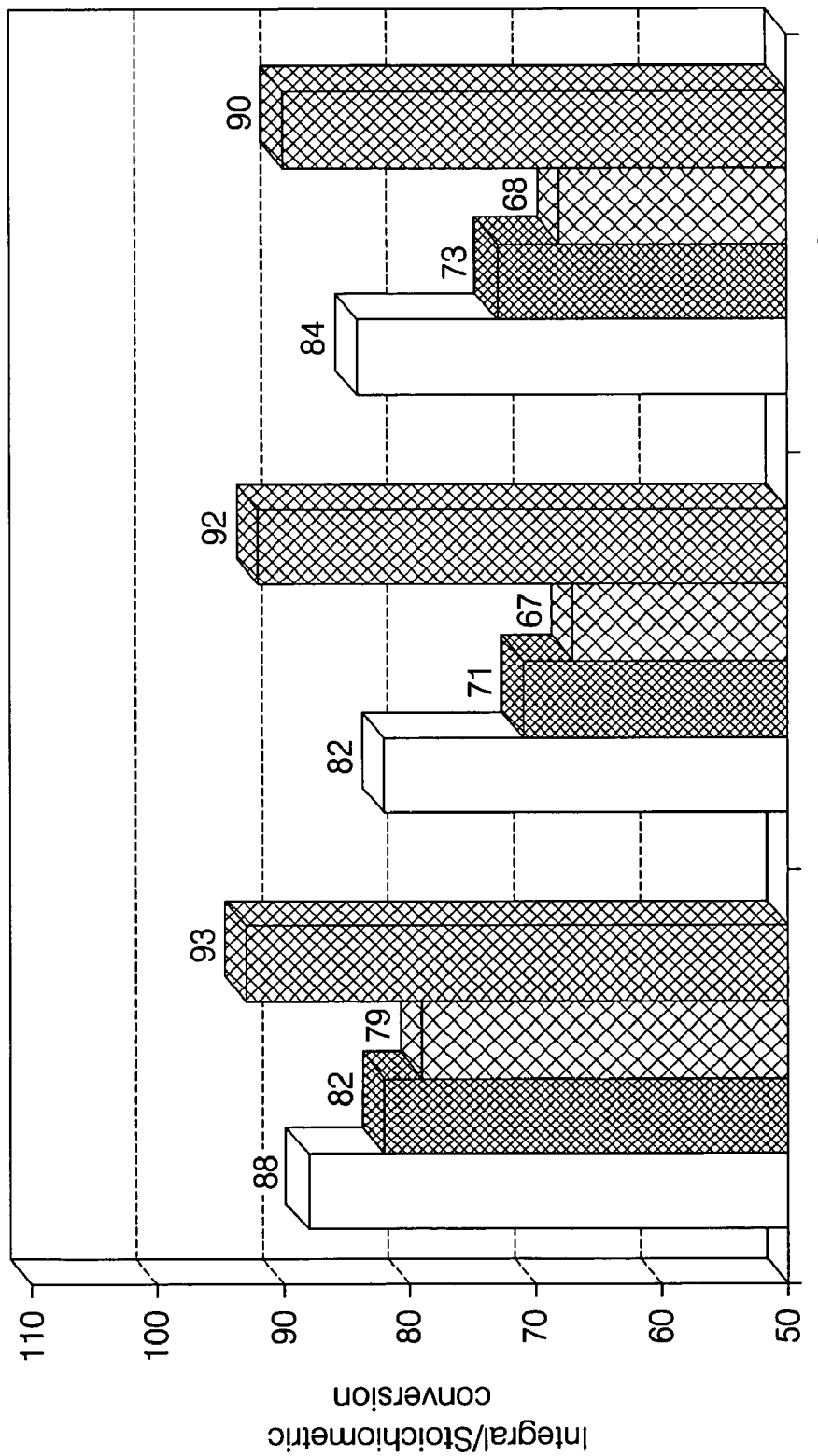
FIG. 14 is a graphical representation of the percent conversion for HC, CO, and NOx for an A/F traverse test at 400° C. after fuel-cut aging for 100 hrs with a maximum bed temperature of 1,000° C.; Pd+Rh of 25 g/ft$^3$ at Pd/Rh ratio of 0:5:1.
Figure 15:
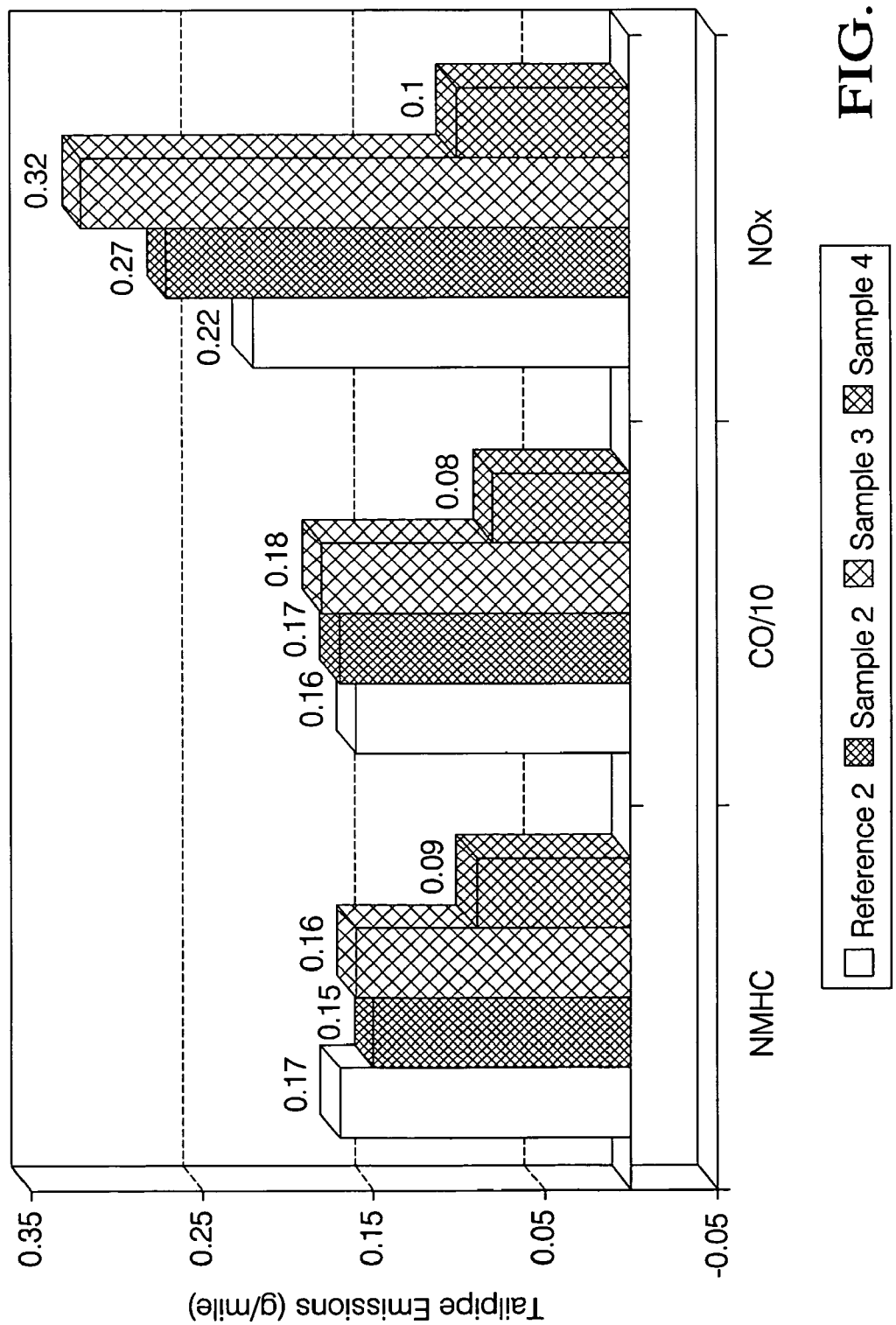
FIG. 15 is a graphical representation of tailpipe emissions for HC, CO, and NOx, after fuel-cut aging for 100 hrs with a maximum bed temperature of 1,000° C.; Pd+Rh of 25 g/ft$^3$ at Pd/Rh ratio of 0:5:1; Catalyst volume of 1.2 L; 400 cpsi/6.5 mil; FTP/Bag on Grand Prix.
Figure 16:
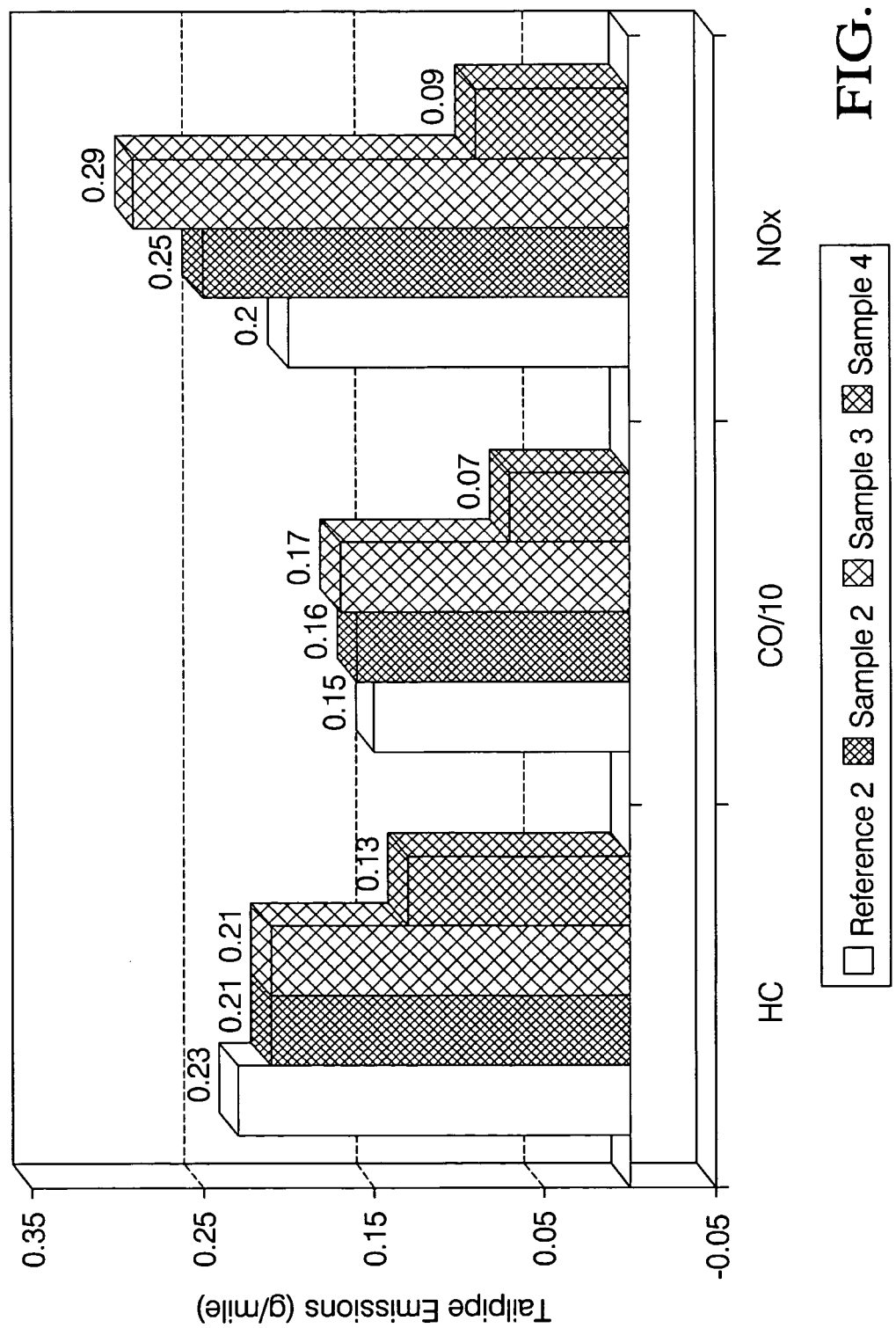
FIG. 16 is a graphical representation of tailpipe emissions for HC, CO, and NOx, after fuel-cut aging for 100 hrs with a maximum bed temperature of 1,000° C.; Pd+Rh of 25 g/ft$^3$ at Pd/Rh ratio of 0:5:1; Catalyst volume of 1.2 L; 400 cpsi/6.5 mil; FTP/Modal on Grand Prix.

Meanwhile, FIGS. 11 and 12 show a further comparison between the same set of four catalysts after fuel-cut aging. Again the Sample 4 catalyst has the best light-off (FIG. 11) and lowest tail pipe emissions (FIG. 12) after vehicle testing. FIGS. 13-16 show further data for this same set of catalysts for fuel-cut aging in a different aging engine where performance advantages for Sample 4 are again noted. FIG. 13 shows light-off performance, while FIG. 14 shows steady state activity. FIGS. 15 and 16 show bag and modal tailpipe emissions, respectively; again supporting that Sample 4 is significantly better than the other three Samples. FIGS. 15 and 16 illustrate the tailpipe emissions using the North American Federal Test Procedure where emissions are collected in a bag and analyzed (FTP/Bag), and where a split stream of the exhaust is continuously sampled through-out the test and analyzed and then integrated over the full test (FTP/Modal).

Figure 17:
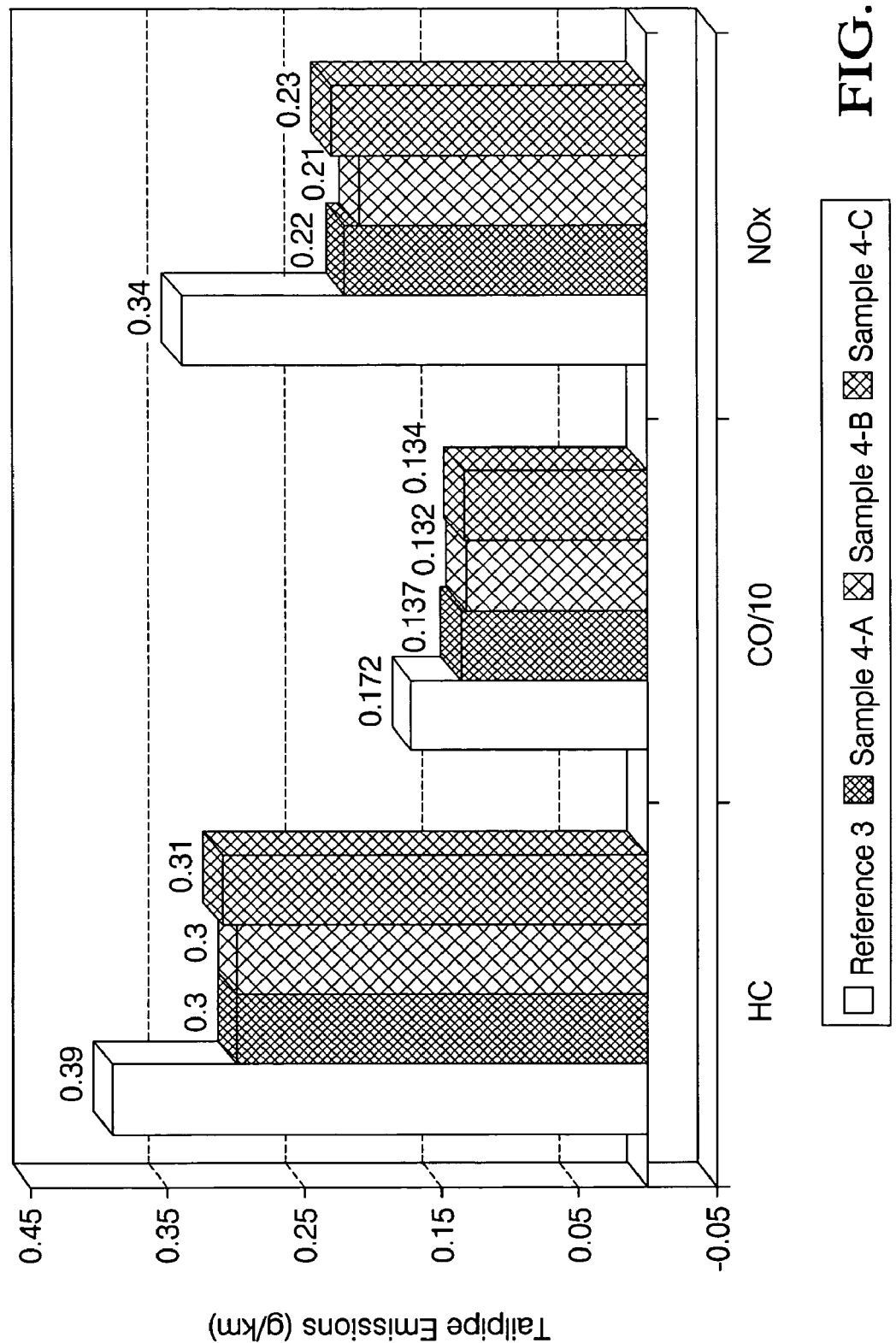
FIG. 17 is a graphical representation of tailpipe emissions for HC, CO, and NOx, after fuel-cut aging for 100 hrs with a maximum bed temperature of 1,000° C.; Pd+Rh of 25 g/ft$^3$ at Pd/Rh ratio of 0:5:1; Catalyst volume of 1.2 L; 400 cpsi/6.5 mil; ECE/EUDC Test.

FIG. 17 compares Reference 3 to three variants of Sample 4 where slight differences in the preparation of the Sample 4 washcoat slurry were evaluated (used a different supplier of the Pt/Rh salts, different supplier of the $BaSO_4$ component, and addition of a rheology modifier). In all three cases Samples 4A, 4B, and 4C performed the same (as predicted) and clearly better than the reference catalyst. The reference is a 1-layer/1-pass catalyst that uses Type I OS and Type II aluminum oxide.

Figure 18:
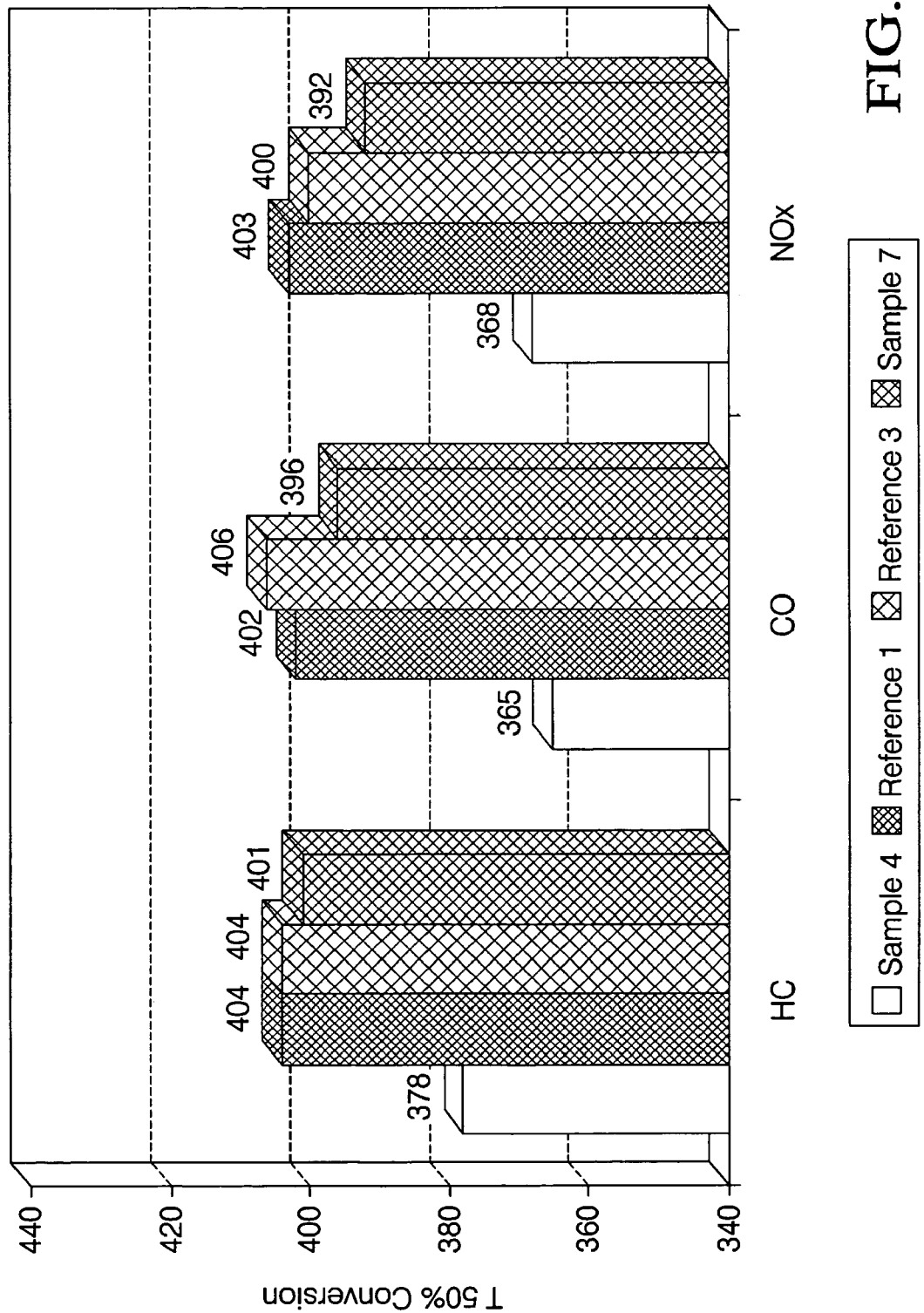
FIG. 18 is a graphical representation of light-off temperature for HC, CO, and NOx, after fuel-cut aging for 100 hrs with a maximum bed temperature of 1,000° C.; Pd+Rh of 25 g/ft$^3$ at Pd/Rh ratio of 0:5:1.
Figure 19:
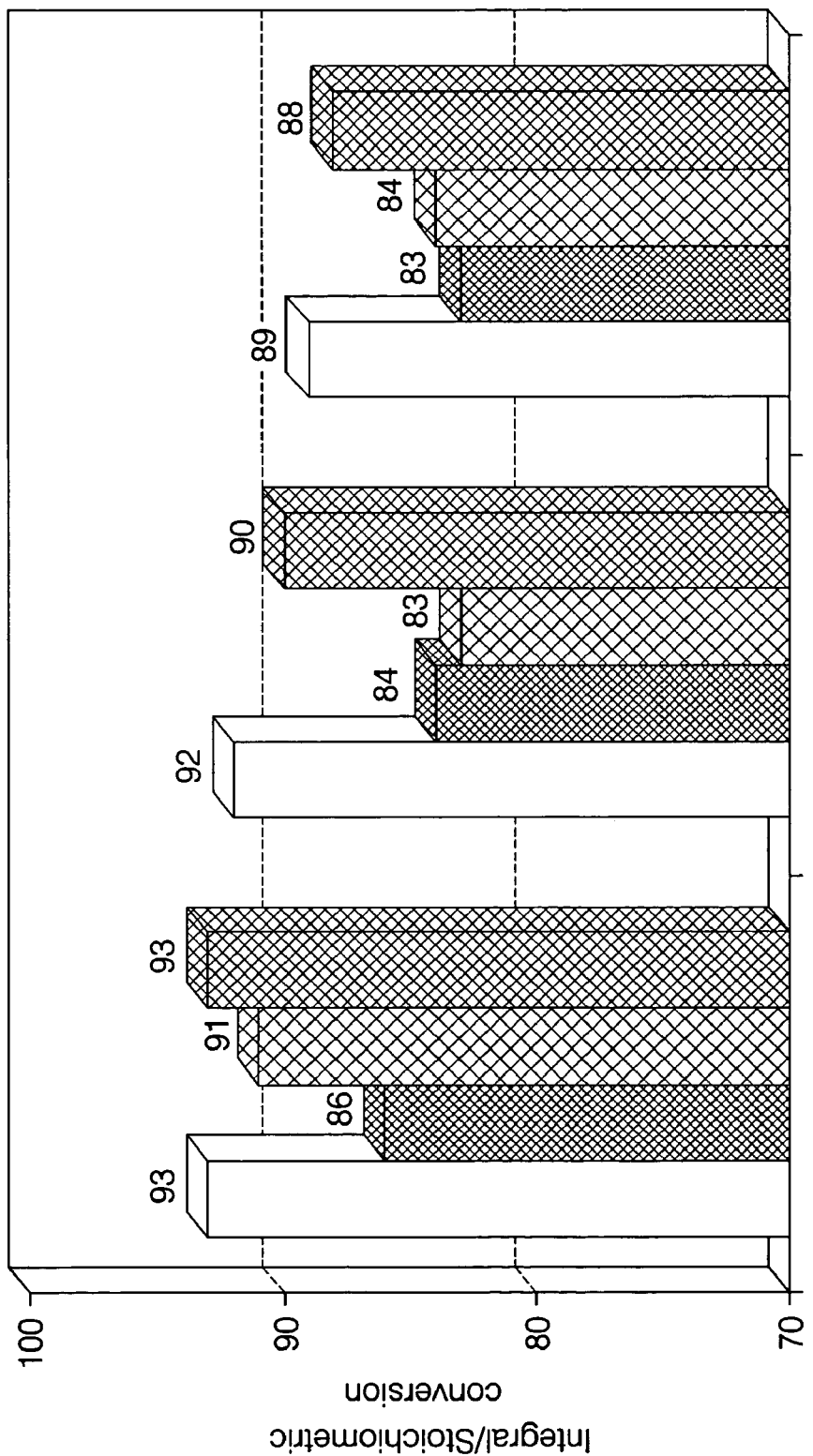
FIG. 19 is a graphical representation of the percent conversion of HC, CO, and NOx for an A/F traverse test at 400° C. after fuel-cut aging for 100 hrs with a maximum bed temperature of 1,000° C.; Pd+Rh of 25 g/ft$^3$ at Pd/Rh ratio of 0:5:1.

FIGS. 18 and 19 represent another comparison between Samples 4 (one layer) and 7, and References 1 and 3. Sample 7 was a combination of Type II aluminum oxides and oxygen storage components where both components were added separately to the slurry during preparation of the washcoat. The best light-off (FIG. 18) activity and steady state activity (FIG. 19) were observed for the Sample 4 technology.

Figure 20:
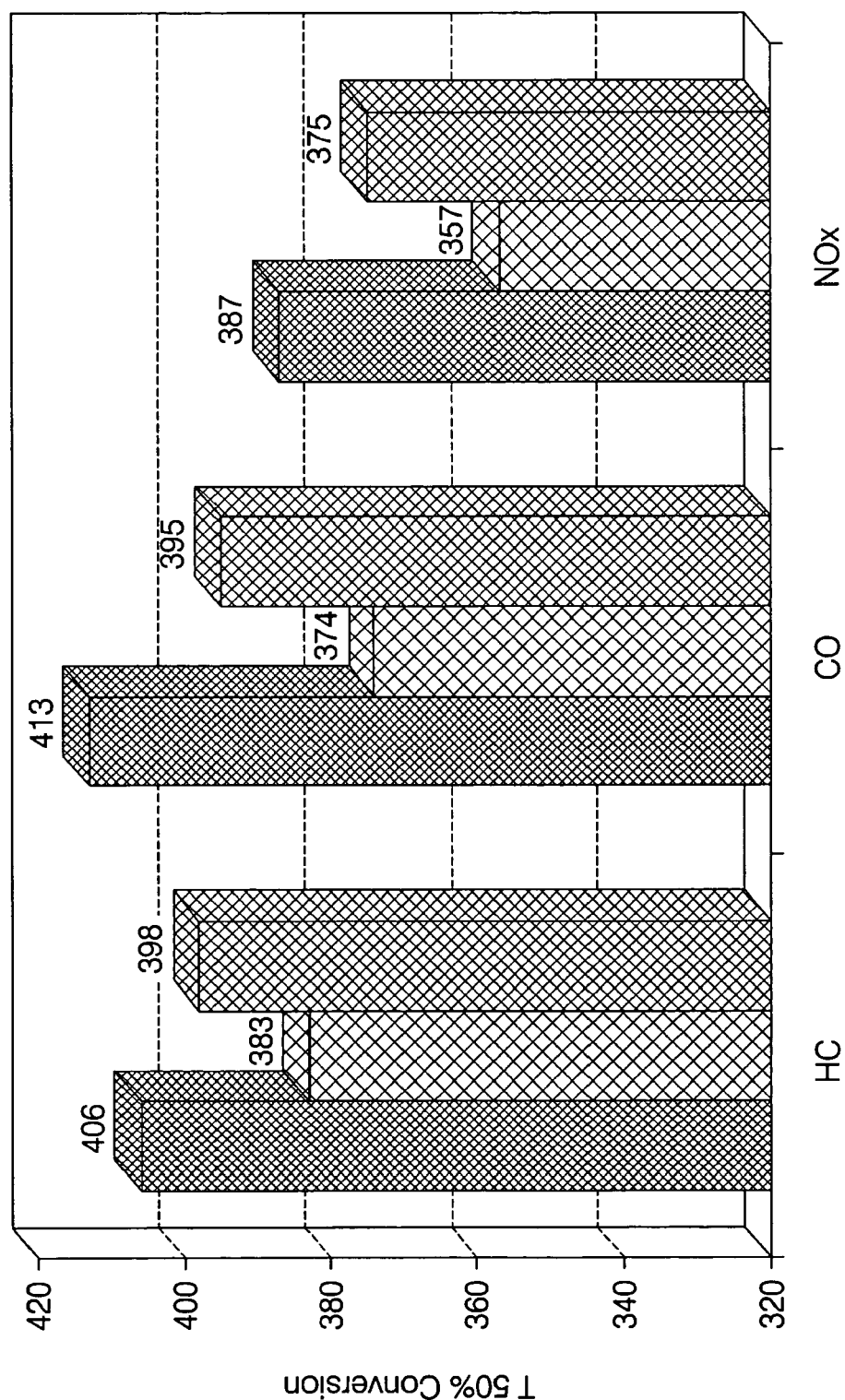
FIG. 20 is a graphical representation of light-off temperature after fuel-cut aging for 100 hrs with a maximum bed temperature of 1,000° C.; Pt+Rh of 25 g/ft$^3$ at Pt/Rh ratio of 5:0:1
Figure 21:
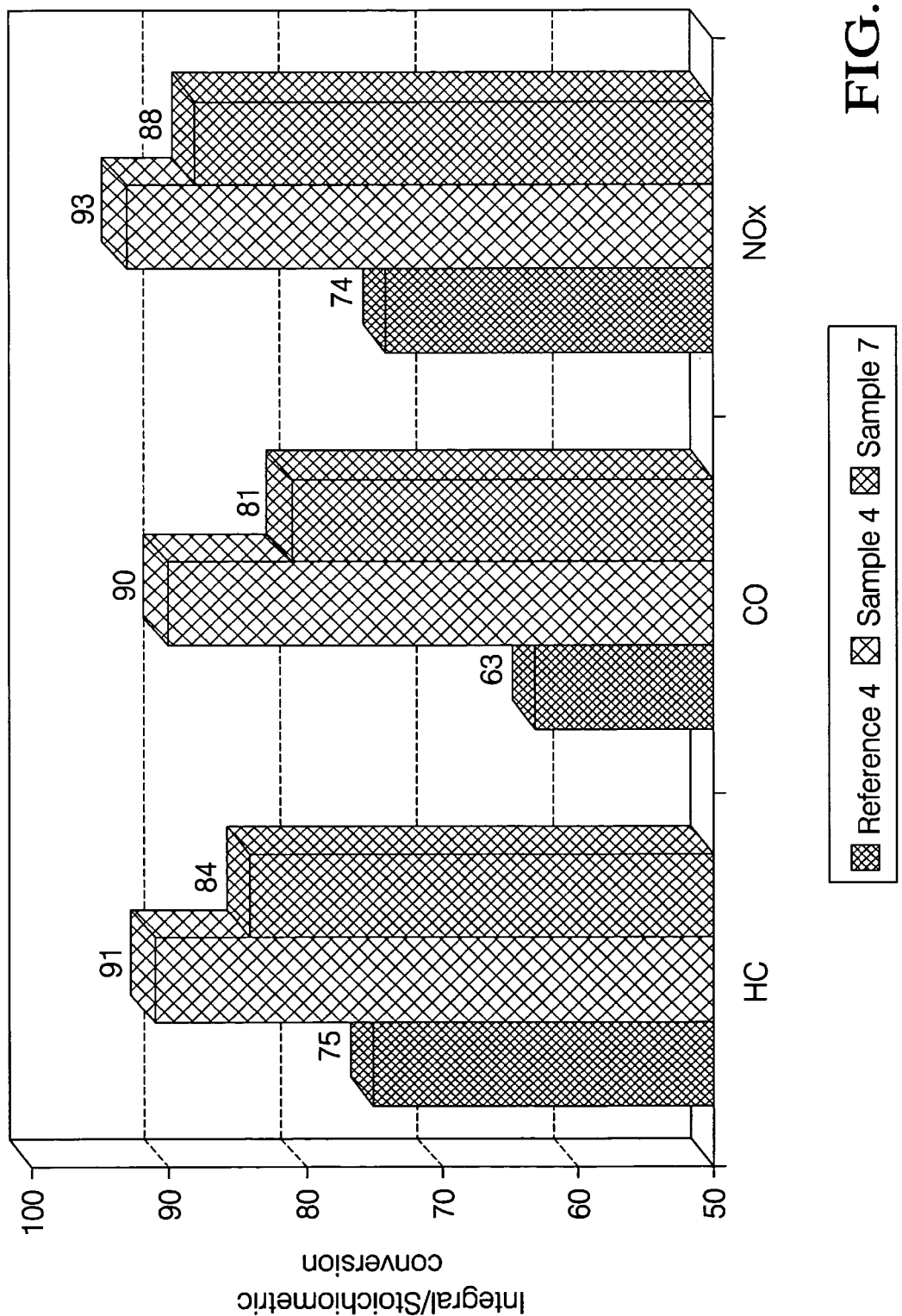
FIG. 21 is a graphical representation of the percent conversion for HC, CO, and NOx for an A/F traverse test at 400° C. after fuel-cut aging for 100 hrs with a maximum bed temperature of 1,000° C.; Pt+Rh of 25 g/ft$^3$ at Pt/Rh ratio of 5:0:1.
Figure 22:
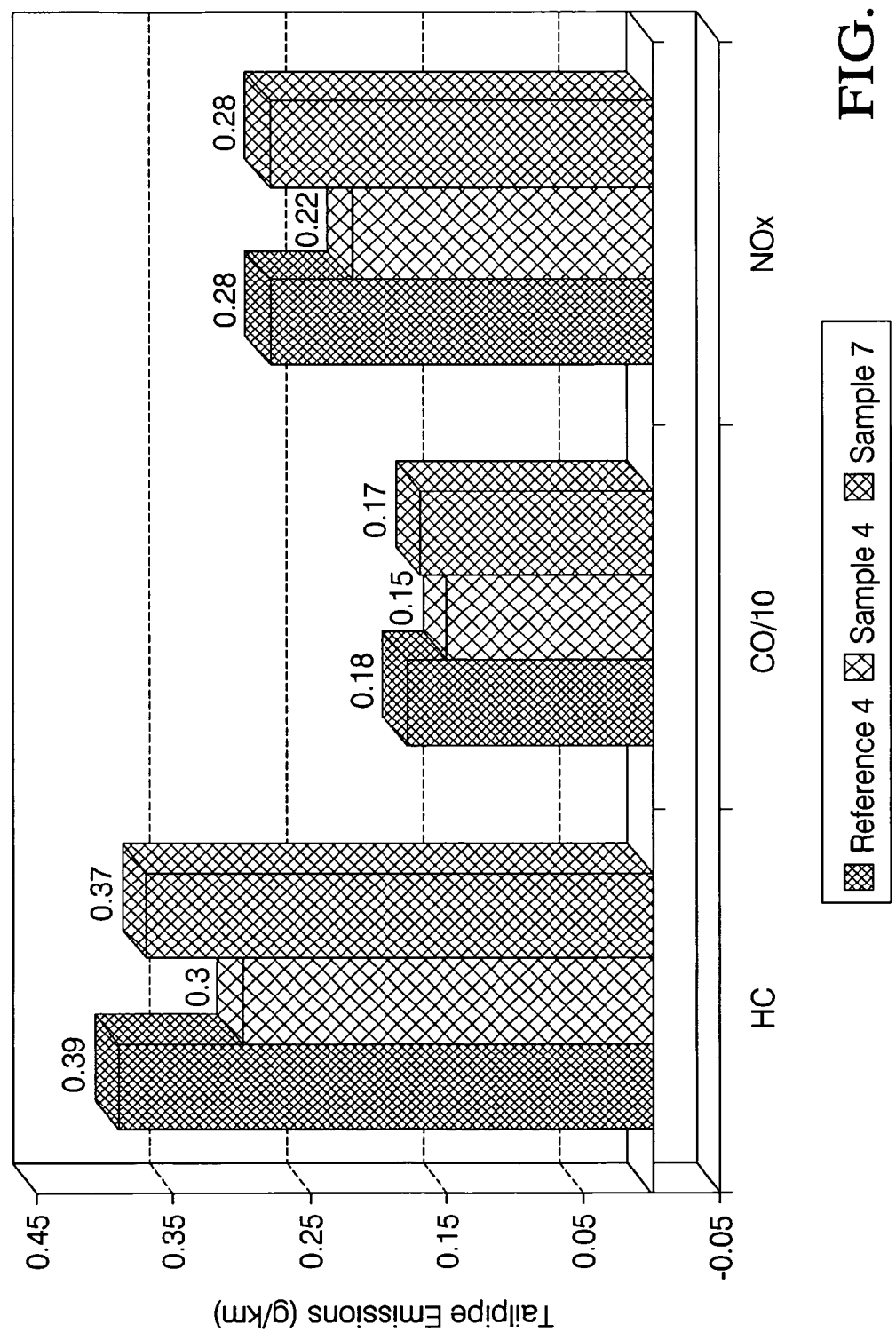
FIG. 22 is a graphical representation of tailpipe emissions for HC, CO, and NOx, after fuel-cut aging for 50 hrs with a maximum bed temperature of 1,000° C.; Pt+Rh of 25 g/ft$^3$ at Pt/Rh ratio of 5:0:1; Catalyst volume of 1.2 L; 400 cpsi/6.5 mil; ECE/EUDC Test.

FIGS. 20-22 show comparisons for Pt/Rh technologies. Again, the Sample 4 technology showed the best performance for light-off (FIG. 20), steady state (FIG. 21), and vehicle testing (FIG. 22).

FIGS. 20 and 21 illustrate the advantages of the composite Type II porous material containing catalysts over physical mixtures of these materials. FIG. 23 is a Transmission Electron Micrograph (TEM) image showing a substantially uniform distribution of the aluminum oxide and the oxygen storage material. The area of highest contrast (dark spots) are the oxygen storage components distributed as individual crystals and/or small clusters. FIG. 24 is a TEM image for a washcoat prepared using a physical mixture and illustrates how the oxygen storage material agglomerates, such that an uneven distribution of oxygen storage and aluminum oxide occurs. The areas of highest contrast (showing up as dark spots in the TEM pictures) represent large clusters of the oxygen storage components which have separated from the aluminum oxide components. As can be seen from the performance data the samples comprising the composite system with Type II oxygen storage components dispersed as clusters or discrete crystallites in the Type II aluminum oxide matrix had lower light off, and higher conversion efficiencies as compared to the physical mixtures.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A composition, comprising:
a composite comprising a Type II aluminum oxide component matrix having pore size of 120 Å to 1000 Å in diameter; and
about 5 wt % to about 70 wt % Type II oxygen storage crystallite component, based upon a total weight of the composite, wherein the oxygen storage crystallite component comprises clusters of primary oxygen storage particles having a particle size, measured along a major axis, of about 50 Å to about 100 Å;
said clusters being porous with a pore size of 120 Å to 1000 Å in diameter;
wherein the clusters comprise about 5 to about 500 primary oxygen storage particles, and wherein the clusters are dispersed within the aluminum oxide component matrix;
said composition having been made by a method comprising:
combining a Type II aluminum hydroxide gel with a Type II oxygen storage gel prior to any calcination to form a combined gel; and
spray drying the combined gel to form a dried composite.

2. The composition of claim 1, wherein the composite comprises about 10 wt % to about 50 wt % oxygen storage crystallite component, based upon a total weight of the composite.

3. The composition of claim 2, wherein the composite comprises about 20 wt % to about 40 wt % oxygen storage crystallite component, based upon a total weight of the composite.

4. The composition of claim 1, wherein the clusters comprise about 10 to about 150 primary oxygen storage particles.

5. The composition of claim 4, wherein the clusters comprise about 20 to about 50 primary oxygen storage particles.

6. The composition of claim 1, wherein the composite comprises a pore volume of about 0.2 $cm^3$/g to about 1.2 $cm^3$/g.

7. The composition of claim 6, wherein the pore volume is about 0.6 $cm^3$/g to about 1.0 $cm^3$/g.

8. The composition of claim 1, wherein the composite comprises a surface area of about 40 to about 200 $m^2$/g.

9. The composition of claim 8, wherein the surface area is about 80 $m^2$/g to about 150 $m^2$/g.

10. The composition of claim 1, wherein the oxygen storage crystallite component comprises cerium, zirconium, and an additive selected from the group consisting of alkaline earth metal, rare earth metal, transition metal, and mixtures thereof.

11. The composition of claim 10, wherein the additive is selected from the group consisting of a strontium, calcium, lanthanum, yttrium, praseodymium, neodymium, manganese, iron, nickel, cobalt, and mixtures thereof.

12. The composition of claim 11, wherein the oxygen storage crystallite component comprises greater than or equal to 2 additives.

13. A composition, comprising:
a composite comprising a Type II aluminum oxide component matrix having pore size of 120 Å to 1000 Å in diameter and a Type II oxygen storage crystallite component, wherein the aluminum oxide component has alumina primary particles with a particle size, as measured along a major axis, of about 50 Å to about 500 Å;
wherein the oxygen storage crystallite component comprises clusters of primary oxygen storage particles having a particle size, measured along a major axis, of about 50 Å to about 100 Å;
said clusters being porous with a pore size of 120 Å to 1000 Å in diameter;
wherein the clusters comprise about 5 to about 500 primary oxygen storage particles which are dispersed within the aluminum oxide component matrix;
said composition having been made by a method comprising:
combining a Type II aluminum hydroxide gel with a Type II oxygen storage gel prior to any calcination to form a combined gel; and
spray drying the combined gel to form a dried composite.

14. A method for making a composition, which composition comprises
a Type II aluminum oxide component matrix having pore size of 120 Å to 1000 Å in diameter; and
about 5 wt % to about 70 wt % Type II oxygen storage crystallite component, based upon a total weight of the composite, wherein the oxygen storage crystallite component comprises clusters of primary oxygen storage particles having a particle size, measured along a major axis, of about 50 Å to about 100 Å;
said clusters being porous with a pore size of 120 Å to 1000 Å in diameter;
wherein the clusters comprise about 5 to about 500 primary oxygen storage particles, and wherein the clusters are dispersed within the aluminum oxide component matrix;
said method comprising:
combining a Type II aluminum hydroxide gel with a Type II oxygen storage gel prior to any calcination to form a combined gel; and
spray drying the combined gel to form a dried composite.

15. The method of claim 14, further comprising calcining the dried composite to form a calcined composite comprising an oxygen storage component and an aluminum oxide matrix.

16. The method of claim 14, further comprising forming an aluminum hydroxide precursor, stabilizing the aluminum hydroxide precursor, and forming the Type II aluminum hydroxide gel.

17. The method of claim 14, further comprising forming the Type II oxygen storage gel from an oxygen storage component precursor comprising cerium salt, zirconium salt, and an additive selected from the group consisting of alkaline earth salt, rare earth salt, transition metal salt, mixtures thereof.

18. The method of claim 17, wherein the additive is selected from the group consisting of a strontium salt, calcium salt, lanthanum salt, yttrium salt, praseodymium salt, neodymium salt, manganese salt, iron salt, nickel salt, cobalt salt, and mixtures thereof.

19. An exhaust emission control device, comprising:
a housing;
a substrate comprising a catalyst supported on a composite, wherein the composite comprises
a Type II aluminum oxide component matrix having a pore size of 120 Å to 1000 Å in diameter and a Type II oxygen storage crystallite component, wherein the aluminum oxide component has alumina primary particles with a diameter, as measured along a major axis, of about 50 Å to about 500 Å;

wherein the oxygen storage crystallite component comprises clusters of primary oxygen storage particles having a particle size, measured along a major axis, of about 50 Å to about 100 Å and having a pore size of 120 Å to 1000 Å in diameter;

wherein the clusters comprise about 5 to about 500 primary oxygen storage particles; and wherein the clusters are dispersed within the aluminum oxide component matrix; and a retention material disposed between the housing and the substrate.

20. A composition, comprising:

a composite comprising a Type II aluminum oxide component matrix having pore size of 120 Å to 1000 Å in diameter; and about 5 wt % to about 70 wt % Type II oxygen storage crystallite component, based upon a total weight of the composite, wherein the oxygen storage crystallite component consists of clusters of primary oxygen storage particles having a particle size, measured along a major axis, of about 50 Å to about 100 Å;

said clusters being porous with a pore size of 120 Å to 1000 Å in diameter;

wherein the clusters comprise about 5 to about 500 primary oxygen storage particles, and wherein the clusters are dispersed within the aluminum oxide component matrix;

said composition having been made by a method comprising:

combining a Type II aluminum hydroxide gel with a Type II oxygen storage gel prior to any calcination to form a combined gel; and spray drying the combined gel to form a dried composite.

* * * * *